US010990842B2

(12) United States Patent
Kim et al.

(10) Patent No.: US 10,990,842 B2
(45) Date of Patent: Apr. 27, 2021

(54) DISPLAY FOR SENSING INPUT INCLUDING A FINGERPRINT AND ELECTRONIC DEVICE INCLUDING DISPLAY

(71) Applicant: Samsung Electronics Co., Ltd., Gyeonggi-do (KR)

(72) Inventors: Su Yeon Kim, Gyeonggi-do (KR); Sang Seob Kim, Gyeonggi-do (KR); Kwang Tai Kim, Gyeonggi-do (KR); Ju Yeong Lee, Seoul (KR); Hyun Ju Hong, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/484,551

(22) PCT Filed: Feb. 8, 2018

(86) PCT No.: PCT/KR2018/001720
§ 371 (c)(1),
(2) Date: Aug. 8, 2019

(87) PCT Pub. No.: WO2018/147661
PCT Pub. Date: Aug. 16, 2018

(65) Prior Publication Data
US 2020/0019804 A1   Jan. 16, 2020

(30) Foreign Application Priority Data

Feb. 8, 2017   (KR) .................. 10-2017-0017359

(51) Int. Cl.
*G06F 3/041*   (2006.01)
*G06K 9/20*   (2006.01)
(Continued)

(52) U.S. Cl.
CPC .......... *G06K 9/2027* (2013.01); *G06F 3/041* (2013.01); *G06K 9/0004* (2013.01);
(Continued)

(58) Field of Classification Search
None
See application file for complete search history.

(56) References Cited

U.S. PATENT DOCUMENTS

| 5,867,574 A | 2/1999 | Eryilmaz |
| 6,453,041 B1 | 9/2002 | Eryilmaz |

(Continued)

FOREIGN PATENT DOCUMENTS

| KR | 1020150073539 | 7/2015 |
| KR | 101567273 | 11/2015 |

(Continued)

OTHER PUBLICATIONS

PCT/ISA/210 Search Report issued on PCT/KR2018/001720, pp. 5.
PCT/ISA/237 Written Opinion issued on PCT/KR2018/001720, pp. 7.

*Primary Examiner* — Kirk W Hermann
(74) *Attorney, Agent, or Firm* — The Farrell Law Firm, P.C.

(57) ABSTRACT

A display arranged over a fingerprint sensor according to an embodiment of the disclosure may include a cover glass, a display panel arranged below the cover glass, a first driver that applies a signal to a first pixel group arranged in a first area corresponding to the fingerprint sensor on the display panel, a second driver that applies a signal to a second pixel group arranged in a second area that does not overlap the first area on the display panel, and a controller that causes the first driver to apply an enable signal to the first pixel group to enable the first driver to emit light when a finger touches a fingerprint sensing area corresponding to the fingerprint sensor on the cover glass.

15 Claims, 18 Drawing Sheets

(51) Int. Cl.
*G06K 9/00* (2006.01)
*G09G 3/32* (2016.01)

(52) U.S. Cl.
CPC ........... *G06K 9/00912* (2013.01); *G09G 3/32* (2013.01); *G09G 2300/0804* (2013.01); *G09G 2310/0267* (2013.01); *G09G 2310/0275* (2013.01)

(56) References Cited

U.S. PATENT DOCUMENTS

| | | |
|---|---|---|
| 6,615,170 B1 | 9/2003 | Liu et al. |
| 9,318,129 B2 | 4/2016 | Vasilieff et al. |
| 9,547,789 B2 | 1/2017 | Park et al. |
| 9,679,182 B2 | 6/2017 | Bae et al. |
| 9,704,013 B2 | 7/2017 | Nelson |
| 9,798,372 B2 | 10/2017 | Kitchens, II et al. |
| 9,823,771 B2 | 11/2017 | Bae et al. |
| 9,864,448 B2 | 1/2018 | Bae et al. |
| 9,891,746 B2 | 2/2018 | Bae et al. |
| 10,031,602 B2 | 7/2018 | Kitchens, II et al. |
| 2014/0354823 A1 | 12/2014 | Kitchens et al. |
| 2014/0354905 A1 | 12/2014 | Kitchens et al. |
| 2015/0177884 A1 | 6/2015 | Han |
| 2015/0316976 A1* | 11/2015 | Toyotaka ............... G06F 1/1641 361/679.27 |
| 2016/0132176 A1 | 5/2016 | Bae et al. |
| 2016/0132177 A1 | 5/2016 | Bae et al. |
| 2016/0132713 A1 | 5/2016 | Bae et al. |
| 2016/0171281 A1 | 6/2016 | Park et al. |
| 2016/0189733 A1 | 6/2016 | Vasilieff et al. |
| 2016/0283772 A1* | 9/2016 | Nelson ..................... G06K 9/00 |
| 2017/0024597 A1 | 1/2017 | Cho et al. |
| 2017/0220838 A1* | 8/2017 | He ......................... G06F 3/0412 |
| 2017/0220842 A1* | 8/2017 | Thompson ............ G06F 1/1643 |
| 2017/0242516 A1 | 8/2017 | Bae et al. |
| 2017/0263183 A1* | 9/2017 | Lin ....................... G09G 3/3233 |
| 2017/0351364 A1 | 12/2017 | Kim et al. |
| 2017/0364188 A1 | 12/2017 | Bae et al. |
| 2018/0012057 A1 | 1/2018 | Cho et al. |
| 2019/0057716 A1 | 2/2019 | Vasilieff et al. |

FOREIGN PATENT DOCUMENTS

| | | |
|---|---|---|
| KR | 1020150131944 | 11/2015 |
| KR | 1020160008087 | 1/2016 |
| KR | 1020160071887 | 6/2016 |
| KR | 1020160096390 | 8/2016 |
| WO | WO 2015/140600 | 9/2015 |

\* cited by examiner

DISPLAY FOR SENSING INPUT INCLUDING A FINGERPRINT AND ELECTRONIC DEVICE INCLUDING DISPLAY

PRIORITY

This application is a National Phase Entry of PCT International Application No. PCT/KR2018/001720 which was filed on Feb. 8, 2018, and claims priority to Korean Patent Application No. 10-2017-0017359, which was filed on Feb. 8, 2017, the content of each of which is incorporated herein by reference.

TECHNICAL FIELD

The disclosure relates to a display for sensing an input and an electronic device including the same.

BACKGROUND ART

With the development of technology for recognizing biometric information, electronic devices including biometric sensors such as fingerprint sensors, iris sensors, and the like have been widely spread. The electronic device may obtain biometric information of a user by using the above-described biometric sensor and store the biometric information therein.

The fingerprint sensor may obtain the fingerprint information of a user based on the light that is reflected by a finger of the user after being emitted from the display. In an electronic device such as a smart phone, the fingerprint sensor may be placed with physical buttons of the display. Recently, a technique of mounting the fingerprint sensor on a display area and obtaining fingerprint information by using the light emitted from the display has been developed.

DISCLOSURE

Technical Problem

The above-described electronic device must apply a signal to all the pixels included in the display to emit light on a part of the display. For example, all the pixels included in the electronic device may be connected to one driver (e.g., an emission driver). Because the pixels are connected to one driver, the electronic device must apply a signal to all the pixels through the driver to allow a part of the display to emit light. However, when a signal is applied to all the pixels included in a display, the amount of consumed current may be increased.

Aspects of the disclosure are to address at least the above-mentioned problems and/or disadvantages and to provide at least the advantages described below. Accordingly, an aspect of the disclosure is to provide an electronic device.

Technical Solution

In accordance with an aspect of the disclosure, a display arranged over a fingerprint sensor may include a cover glass, a display panel arranged below the cover glass, a first driver that applies a signal to a first pixel group arranged in a first area corresponding to the fingerprint sensor on the display panel, a second driver that applies a signal to a second pixel group arranged in a second area that does not overlap the first area on the display panel, and a controller that causes the first driver to apply an enable signal to the first pixel group to enable the first driver to emit light when a finger touches a fingerprint sensing area corresponding to the fingerprint sensor on the cover glass.

In addition, in accordance with another aspect of the disclosure, a display arranged over a fingerprint sensor may include a cover glass, a display panel arranged below the cover glass, a driver connected to at least one pixel arranged in an area corresponding to the fingerprint sensor on the display panel, and a controller electrically connected to the driver, wherein each of the at least one pixel connected to the driver includes a light emitting material that emits light having a first wavelength and a plurality of sub-pixels that emit light having a second wavelength, and wherein the controller is set to allow the driver to apply an enable signal to the light emitting material when a finger touches a fingerprint sensing area corresponding to the fingerprint sensor on the cover glass, thereby allowing the light emitting material to emit the light having the first wavelength.

In addition, in accordance with another aspect of the disclosure, an electronic device may include a housing, a display arranged in the housing, a cover arranged over the display, an array of touch-sensor electrodes arranged between the cover and the display or inside the display to sense a touch on the cover, a fingerprint sensor arranged between the display and the housing and having a fingerprint sensing area arranged in a view area of the display, at least one processor placed in the housing and electrically connected to the display, the array of touch-sensor electrodes, and the fingerprint sensor, and at least one memory placed in the housing, electrically connected to the processor, and configured to store instructions, wherein, the instructions, when executed, cause the processor to: provide a graphic user interface (GUI) for indicating a location of the fingerprint sensor on the display, receive data for sensing a finger of a user in proximity to or in contact with the fingerprint sensing area, control the display to emit light in or around the fingerprint sensing area when the finger of the user is sensed, control the fingerprint sensor to sense a fingerprint of the finger based on light of a part of the light reflected by the finger, and perform authentication by using the sensed fingerprint.

Advantageous Effects

According to the embodiments of the disclosure, the enable signal is applied only to the area corresponding to the fingerprint sensor in the display to emit light, so that the amount of consumed current may be reduced.

MODE FOR INVENTION

Figure 1:
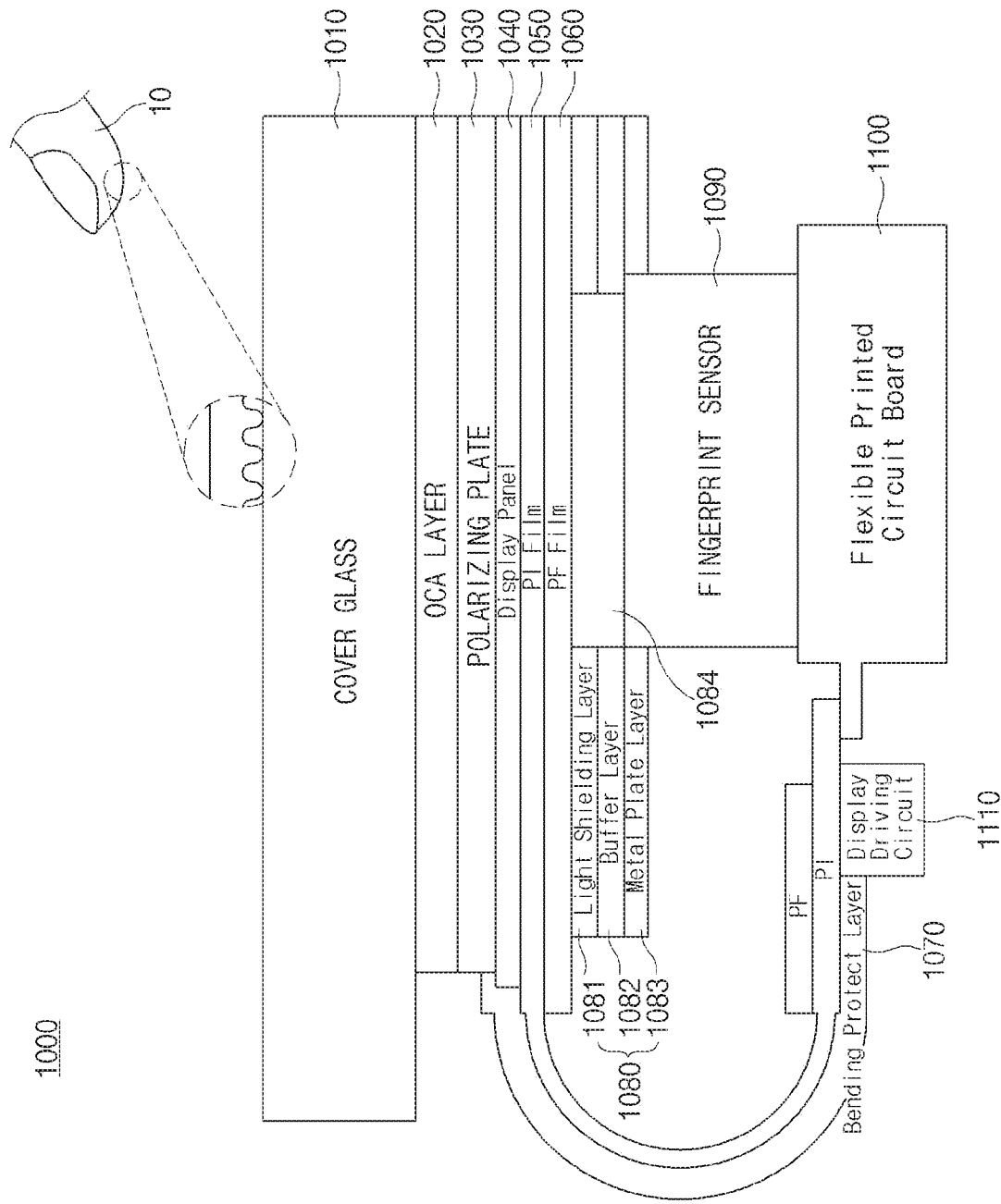
FIG. 1 is a sectional view of an electronic device according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a sectional view of an electronic device according to an embodiment.

Referring to FIG. 1, an electronic device 1000 may include a cover glass 1010, an optical clear adhesive (OCA) layer 1020, a polarizing plate 1030, a display panel 1040, a polyimide (PI) film 1050, a PF film 1060, a bending protect layer (BPL) 1070, a back panel 1080, a fingerprint sensor 1090, an MFPCB 1100, and a display driving circuit 1110.

According to an embodiment of the disclosure, the cover glass 1010 (or cover) may transmit light generated by the display panel 1040. Further, on the cover glass 1010, the user can touch a part of the body (e.g., a finger 10).

According to an embodiment of the disclosure, the OCA layer 1020, which is a transparent adhesive layer, may bond the cover glass 1010 and the polarizing plate 1030.

The polarizing plate 1030 (or polarizing film) may transmit only light that oscillates in one direction of the light input through the cover glass 1010. For example, the polarizing plate 1030 may pass only vertically oscillating light and block horizontally oscillating light.

According to an embodiment of the disclosure, the display panel 1040 may include, for example, a scan line, a data line, and a light emitting element (e.g., an OLED) that emits light based on signals supplied from the scan line and the data line. In addition, the display panel 1040 may include a substrate (e.g., a low temperature poly silicon (LTPS) substrate) on which a light emitting element is mounted, and a thin film encapsulation (TFE) film for protecting the light emitting element.

According to an embodiment of the disclosure, the PI film 1050 may be arranged below the display panel 1040 and include wiring for supplying power and/or a signal to the display panel 1040. As an example, the PI film 1050 may be formed of a material that is bendable. According to an embodiment, the diameter of a curved surface formed by the PI film 1050 may be 0.33 mm to 0.43 mm.

According to an embodiment of the disclosure, the PF film 1060 may be arranged below the PI film 1050 to support the PI film 1050. For example, the thickness of the PF film 1060 may be 0.05 mm to 0.15 mm.

According to an embodiment of the disclosure, the BPL 1070 is attached to a curved area of the PI film 1050 to prevent the PI film 1050 from being cracked (or broken).

According to an embodiment of the disclosure, the back panel 1080 may be arranged below the PF film 1060. The back panel 1080 may include at least one of a light shielding layer 1081 (e.g., an EMBO layer), a buffer layer 1082 (e.g., a sponge layer), and a metal plate layer 1083 (e.g., a copper (Cu) graphite layer). According to an embodiment, an opening 1084 may be formed in an area of the back panel 1080 corresponding to the fingerprint sensor 1090. The fingerprint sensor 1090 may obtain fingerprint information of a finger through the opening 1084 (e.g., an opening having a thickness of 0.1 mm to 0.18 mm). For example, the light emitted by the display panel 1040 may be reflected by the finger 10. The reflected light is transmitted to the fingerprint sensor 1090 through the cover glass 1010, the OCA layer 1020, the polarizing plate 1030, the display panel 1040, the PI film 1050, the PF film 1060, and the opening 1084.

According to an embodiment of the disclosure, the fingerprint sensor 1090 may obtain the fingerprint information of the finger 10. For example, the fingerprint sensor 1090 may capture a fingerprint image by using an image sensor (e.g., CMOS, CCD). The fingerprint sensor 1090 may extract fingerprint minutiae from the fingerprint image. The minutiae may include a ridge ending, a crossover, a bifurcation, pores, and the like included in the fingerprint. The minutiae extracted by the fingerprint sensor 1090 may be used for user authentication. According to an embodiment, the thickness of the fingerprint sensor 1090 may be 0.4 mm to 0.5 mm.

According to an embodiment of the disclosure, the MFPCB 1100 may be electrically connected to a part of the PI film 1050. For example, the MFPCB 1100 may be electrically connected to a conductive pattern (or wiring) formed on the PI film 1050. According to an embodiment, the fingerprint sensor 1090 may be mounted on one surface of the MFPCB 1100. Although not shown in FIG. 1, a fingerprint sensor IC may be mounted on another surface of the MFPCB 1100.

According to an embodiment of the disclosure, the display driving circuit (display driver IC; DDI) 1110 may be arranged in a partial area of the PI film 1050. The display driving circuit 1110 may control the display panel 1040 through the PI film 1050. For example, the display driving circuit 1110 may allow a partial area of the display panel 1040 to emit light.

According to an embodiment of the disclosure, the electronic device 1000 may include a housing. The housing may include a first surface and a second surface facing the first surface. The first surface may correspond to the cover glass 1010, or may be arranged over the cover glass 1010. The second surface may correspond to the back cover or may be arranged below the back cover.

In the disclosure, the contents described with reference to FIG. 1 may be equally applied to the components having the same reference numerals as those of the electronic device 1000 shown in FIG. 1.

Figure 2A:
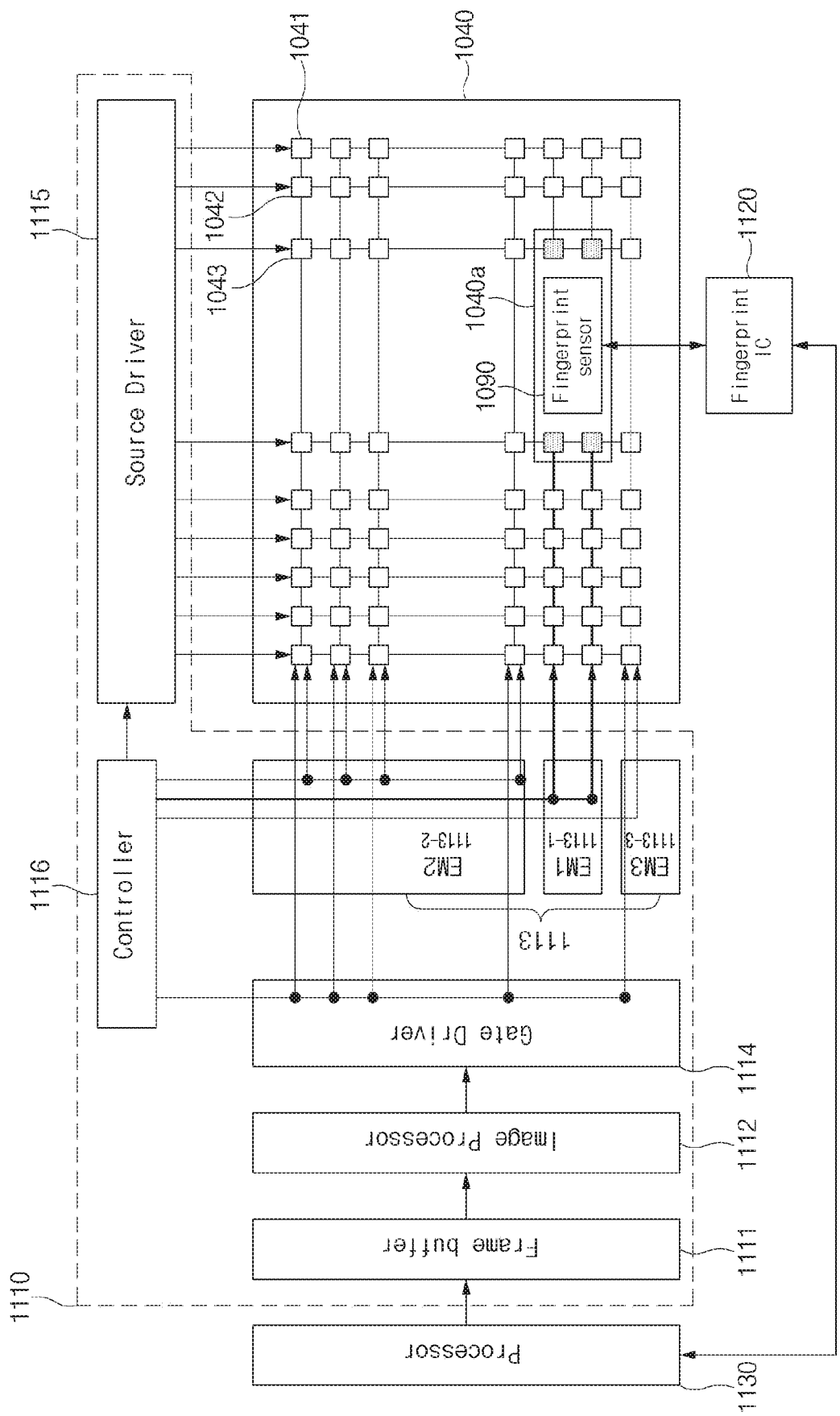
FIG. 2A is a block diagram of an electronic device according to an embodiment.

FIG. 2A is a block diagram of an electronic device according to an embodiment. FIG. 2A is a block diagram illustrating configurations included in the electronic device 1000 shown in FIG. 1

Referring to FIG. 2A, the electronic device 1000 may include the display panel 1040, the display driving circuit 1110, a fingerprint sensor IC 1120, and a processor 1130.

The display panel 1040 may include a plurality of pixels 1041, 1042, and 1043. According to an embodiment, the display panel 1040 may include a first pixel group 1040a arranged in a first area and a second pixel group arranged in a second area. The first area may be an area corresponding to the fingerprint sensor 1090 on the display panel 1040. The second area may be an area not overlapping the first area on the display panel 1040. For example, the second area may be a remaining area other than the first area on the display panel 1040.

The display driving circuit 1110 may include a frame buffer 1111, an IP 1112, an emission driver 1113, a gate driver 1114, a source driver 1115, and a controller 1116. The frame buffer 1111 may receive a display list from the processor 1130 and store the display list. The display list may include a shape, a color, and the like of an object output from the display. According to an embodiment, the frame buffer 1111 may store an on/off control signal, color data, and the like of each pixel in a bitmap.

The IP 1112 may be configured to convert the original data corresponding to a pixel structure (e.g., a pentile structure, or the like) to improve the image quality.

According to an embodiment of the disclosure, the emission driver 1113 may control the difference between a first voltage (e.g., ELVdd) and a second voltage (e.g., ELVss) to control whether to allow each pixel to emit light (to be turned on or off). The gate driver 1114 may control the voltage of the gate terminal of the scan transistor (TFT) to control whether to allow each pixel to emit light.

According to an embodiment of the disclosure, the emission driver 1113 or the gate driver 1114 may be divided into a plurality of drivers based on the pixels connected to the emission driver 1113 or the gate driver 1114. As shown in FIG. 2A, when describing an embodiment in which the emission driver 1113 is divided into first to third drivers 1113-1 to 1113-3, the first driver 1113-1 may be connected to the first pixel group 1040a. Because the first driver 1113-1 is connected to the first pixel group 1040a, the first driver 1113-1 may control whether to allow the first pixel group 1040a to emit light. For example, the first driver 1113-1 may allow the first pixel group 1040a to emit light to obtain fingerprint information of a finger.

According to an embodiment of the disclosure, the second driver 1113-2 may be connected to some pixels of the second pixel group. The second driver 1113-2 may control whether to allow some pixels to emit light. For example, when the first pixel group 1040a emits light to obtain fingerprint information of a finger, the second driver 1113-2 may control such that some pixels do not emit light. The third driver 1113-3 may be connected to the remaining pixels except for the pixels connected to the second driver 1113-2 of the second pixel group. The third driver 1113-3 may control whether to allow the remaining pixels to emit light.

Although the emission driver 1113 divided into the first to third drivers 1113-1 to 1113-3 is shown in FIG. 2A, the emission driver 1113 may be divided into two drivers. For example, the second driver 1113-2 may be connected to all the pixels except for the first pixel group 1040a to control whether to allow all pixels except for the first pixel group 1040a to emit light.

According to an embodiment of the disclosure, the source driver 1115 may drive each pixel by applying a signal to a data line and a reference line.

According to an embodiment of the disclosure, the controller 1116 may control the emission driver 1113, the gate driver 1114, and the source driver 1115. For example, when a finger touches the fingerprint sensing area, the controller 1116 may allow the first driver 1113-1 to apply an enable signal to the first pixel group 1040a. When the enable signal is applied, the first pixel group 1040a may emit light. The fingerprint sensing area may correspond to the fingerprint sensor 1090 on the cover glass. The enable signal may be a signal capable of causing the first pixel group 1040a to emit light. For example, the enable signal may be a threshold voltage value of each pixel included in the first pixel group 1040a.

According to an embodiment of the disclosure, when the first pixel group 1040a is lighted, the light emitted from the first pixel group 1040a may be reflected by the finger and input to the fingerprint sensor 1090. The fingerprint sensor 1090 may obtain the fingerprint information (e.g., the number of feature points, distribution of feature points, and the like) of the finger based on the light input to the fingerprint sensor 1090. When the fingerprint information is obtained, the fingerprint sensor IC 1120 may transmit the obtained fingerprint information to the processor 1130.

According to an embodiment of the disclosure, the processor 1130 may perform user authentication based on the fingerprint information obtained through the fingerprint sensor 1090. For example, when the fingerprint information stored in the memory matches the fingerprint information obtained through the fingerprint sensor 1090 by a preset ratio or more, the processor 1130 may release the lock state of the electronic device.

According to an embodiment of the disclosure, the configurations of the display panel 1040 and the display driving circuit 1110 may be different from those shown in FIG. 2A. For example, although the emission driver 1113, the gate driver 1114, and the source driver 1115, which are included in the display driving circuit 1110, are shown in FIG. 2A, the emission driver 1113, the gate driver 1114, and the source driver 1115 may be included in the display panel 1040.

In the disclosure, the contents described with reference to FIG. 2A may be equally applied to the components having the same reference numerals as those of the electronic device 1000 shown in FIG. 2A.

Figure 2B:
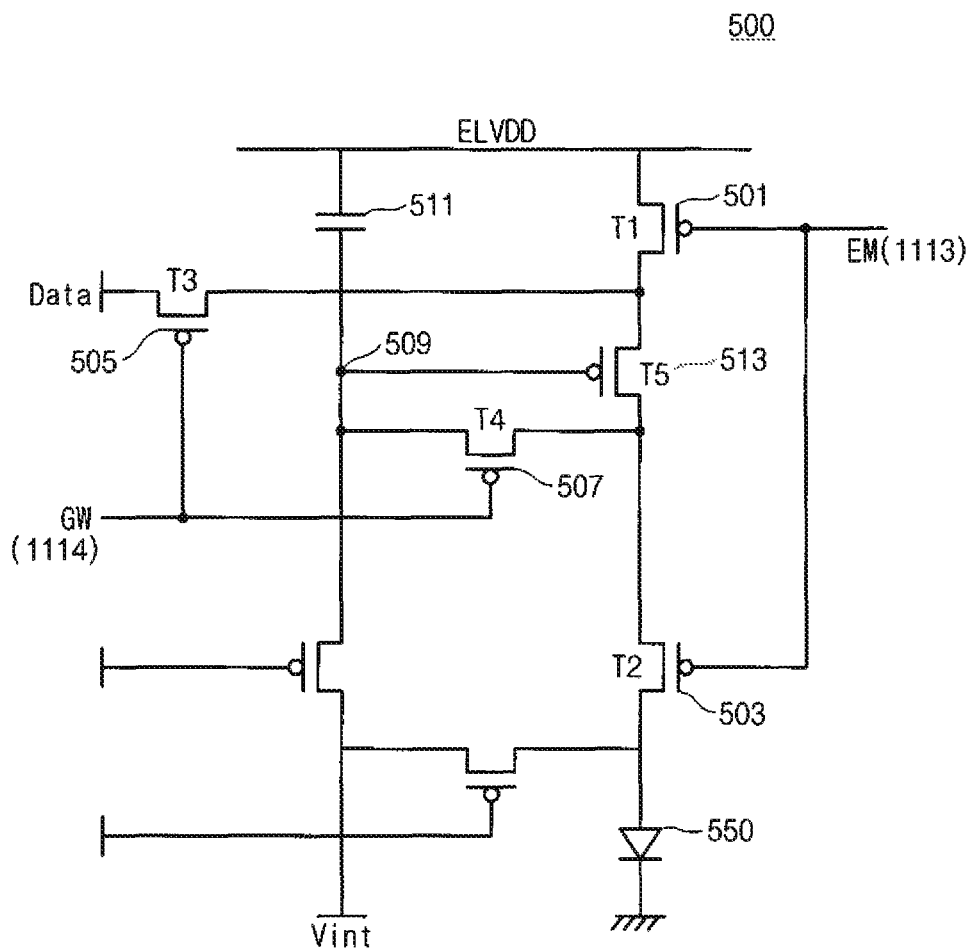
FIG. 2B is an equivalent circuit diagram of a pixel according to an embodiment.

FIG. 2B shows an equivalent circuit diagram of a pixel according to an embodiment. A pixel 500 shown in FIG. 2B may be any one of the pixels included in the first pixel group 1040a shown in FIG. 2A.

Referring to FIG. 2B, the emission driver 1113 may allow a light emitting diode 550 included in the pixel 500 to emit light. For example, when the emission driver 1113 applies an enable signal to first and second transistors 501 and 503, the first and second transistor 501 and 503 may be turned on. In this case, a fifth transistor 513 may be in a turn-on state. When the first and second transistors 501 and 503 are turned on so that a current flows through the first and second transistors 501 and 503, the current may turn on the light emitting diode 550.

According to an embodiment, the emission driver 1113 may apply an enable signal to all the pixels included in the first pixel group 1040a through the operation described above. When the enable signal is applied to all the pixels included in the first pixel group 1040*a*, the first pixel group 1040*a* may emit light.

According to another embodiment of the disclosure, the gate driver 1114 may also allow the light emitting diode 550 included in the pixel 500 to emit light. For example, when the gate driver 1114 applies the enable signal to third and fourth transistors 505 and 507, the third and fourth transistors 505 and 507 may be turned on. When the third and fourth transistors 505 and 507 are turned on, a voltage having a magnitude equal to the difference between the first voltage (e.g., ELVDD) and the second voltage (e.g., the voltage at a point 509) may be applied to a capacitor 511. When the voltage is applied to the capacitor 511, the fifth transistor 513 is turned on so that the current flows through the fifth transistor 513. In this case, the first and second transistors 501 and 503 may be in a turn-on state. When the current flows through the fifth transistor 513, the current may turn on the light emitting diode 550.

According to an embodiment, the gate driver 1114 may apply the enable signal to all the pixels included in the first pixel group 1040*a* through the above-described operation. When the enable signal is applied to all the pixels included in the first pixel group 1040*a*, the first pixel group 1040*a* may emit light.

According to an embodiment of the disclosure, the electronic device 1000 may apply the enable signal to the pixels through the emission driver 1113 and/or the gate driver 1114 to allow the first pixel group 1040*a* to emit light.

Figure 3:
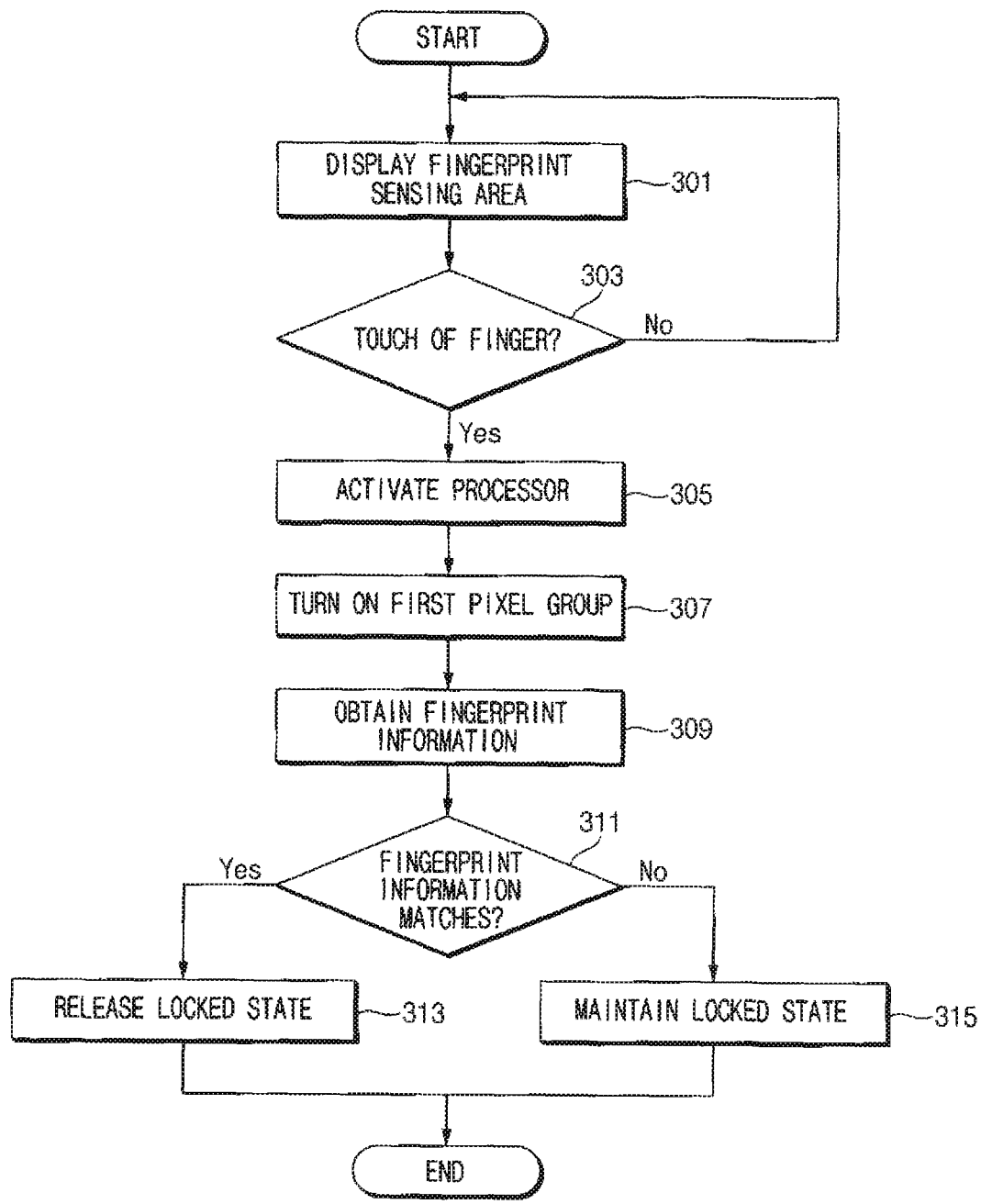
FIG. 3 is a flowchart illustrating an operation of an electronic device according to an embodiment.

FIG. 3 is a flowchart illustrating an operation of an electronic device according to an embodiment. The flowchart illustrated in FIG. 3 is a flowchart illustrating an operation of the electronic device 1000 shown in FIGS. 1 and 2A.

Referring to FIG. 3, in operation 301, the processor 1130 may display the fingerprint sensing area on the cover glass. For example, the processor 1130 may display the fingerprint sensing area by applying a preset voltage to the first pixel group 1040*a*. When the fingerprint sensing area is displayed, in operation 303, the processor 1130 may determine whether a finger touches the fingerprint sensing area. For example, the processor 1130 may determine whether the finger touches the fingerprint sensing area through the touch sensor.

When the finger touches the fingerprint sensing area, in operation 305, the processor 1130 may enter an idle state (or an active state). For example, when the processor 1130 is in an inactive state and the finger touches the fingerprint sensing area before the finger touches the fingerprint sensing area, the processor 1130 may enter the active state from the inactive state.

When the processor 1130 enters the active state, in operation 307, the processor 1130 may cause the first pixel group 1040*a* to emit (or be turned on). For example, the processor 1130 may cause the controller 1116 to apply an enable signal to the first pixel group 1040*a* through the first driver 1113-1. When the enable signal is applied to the first pixel group 1040*a*, the first pixel group 1040*a* may emit light. The light emitted from the first pixel group 1040*a* may be reflected by the finger 10 in contact with the cover glass 1010 and input to the fingerprint sensor 1090. In operation 309, the processor 1130 may obtain the fingerprint information based on the light input to the fingerprint sensor 1090. For example, the processor 1130 may obtain the number of feature points, distribution of the feature points, and the like.

When the fingerprint information is obtained, in operation 311, the processor 1130 may compare the fingerprint information stored in the memory with the fingerprint information obtained through the fingerprint sensor 1090 to determine whether the fingerprint information matches each other. When the fingerprint information matches each other as the determination result, in operation 313, the processor 1130 may releases the locked state of the electronic device 1000. When the fingerprint information does not match each other, in operation 315, the processor 1130 may maintain the locked state of the electronic device 1000.

Figure 4:
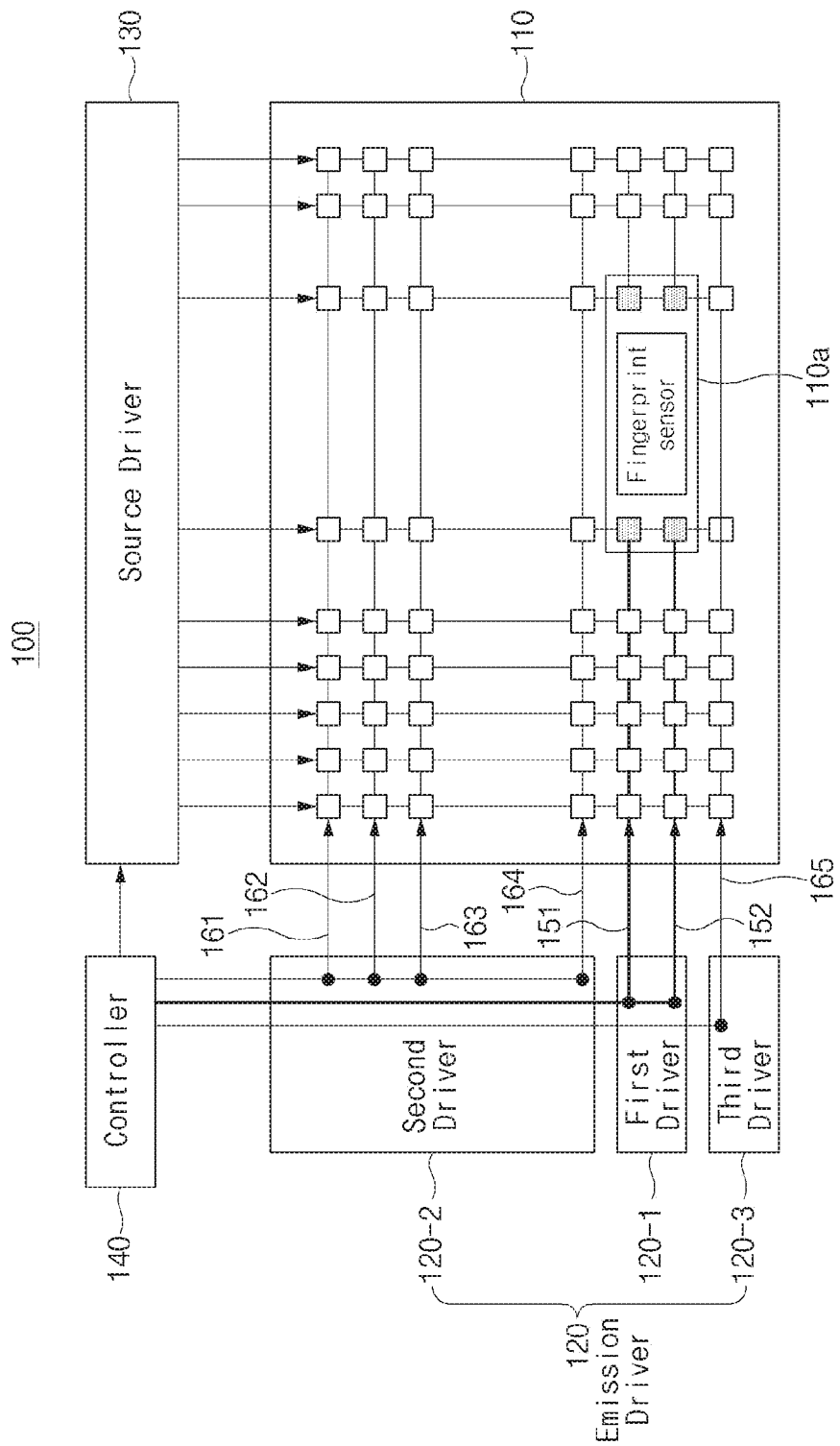
FIG. 4 is a block diagram of a display in which an emission driver is divided into a plurality of drivers according to an embodiment.

FIG. 4 is a block diagram of a display in which an emission driver is divided into a plurality of drivers according to an embodiment.

Referring to FIG. 4, a display 100 may include a display panel 110, first to third drivers 120-1 to 120-3, a source driver 130, and a controller 140. The display panel 110, the source driver 130 and the controller 140 to be described below may correspond to, for example, the display panel 1040, the source driver 1115, and the controller 1116 shown in FIG. 2A. The first to third drivers 120-1 to 120-3 may be drivers into which an emission driver 120 is divided based on the pixels connected to the emission driver 120.

According to an embodiment of the disclosure, when a finger touches the fingerprint sensing area, the controller 140 may allow the first driver 120-1 to apply an enable signal to a first pixel group 110*a*. When the enable signal is applied, the first pixel group 110*a* may emit light. The controller 140 may cause all the pixels included in the first pixel group 110*a* or some pixels of the first pixel group 110*a* to emit light. In addition, the controller 140 may allow the pixels included in the first pixel group 110*a* to sequentially emit light. For example, the controller 140 may allow the pixels connected through a line 151 among the pixels included in the first pixel group 110*a* to emit light. After the pixels connected through the line 151 emit light, the controller 140 may allow the pixels connected through a line 152 among the pixels included in the first pixel group 110*a* to emit light.

According to an embodiment, when the first pixel group 110*a* is allowed to emit light, the controller 140 may apply a disable signal to the second and third drivers 120-2 and 120-3 to prevent the second pixel group from emitting light. For example, the second driver 120-2 may turn off the pixels connected through lines 161, 162, 163, and 164, and the third driver 120-3 may turn off the pixels connected through a line 165.

According to an embodiment, the second and third drivers 120-2 and 120-3 may not operate when the first pixel group 110*a* emits light. Because the second and third drivers 120-2 and 120-3 do not operate, the pixels connected through the lines 161, 162, 163, and 164 and the pixels connected through the line 165 may be turned off. Thus, the consumed current required to allow the first pixel group 110*a* to emit light may be reduced.

According to an embodiment of the disclosure, an amount of consumed current may be small because an enable signal is applied through the first driver when sensing a fingerprint.

Figure 5:
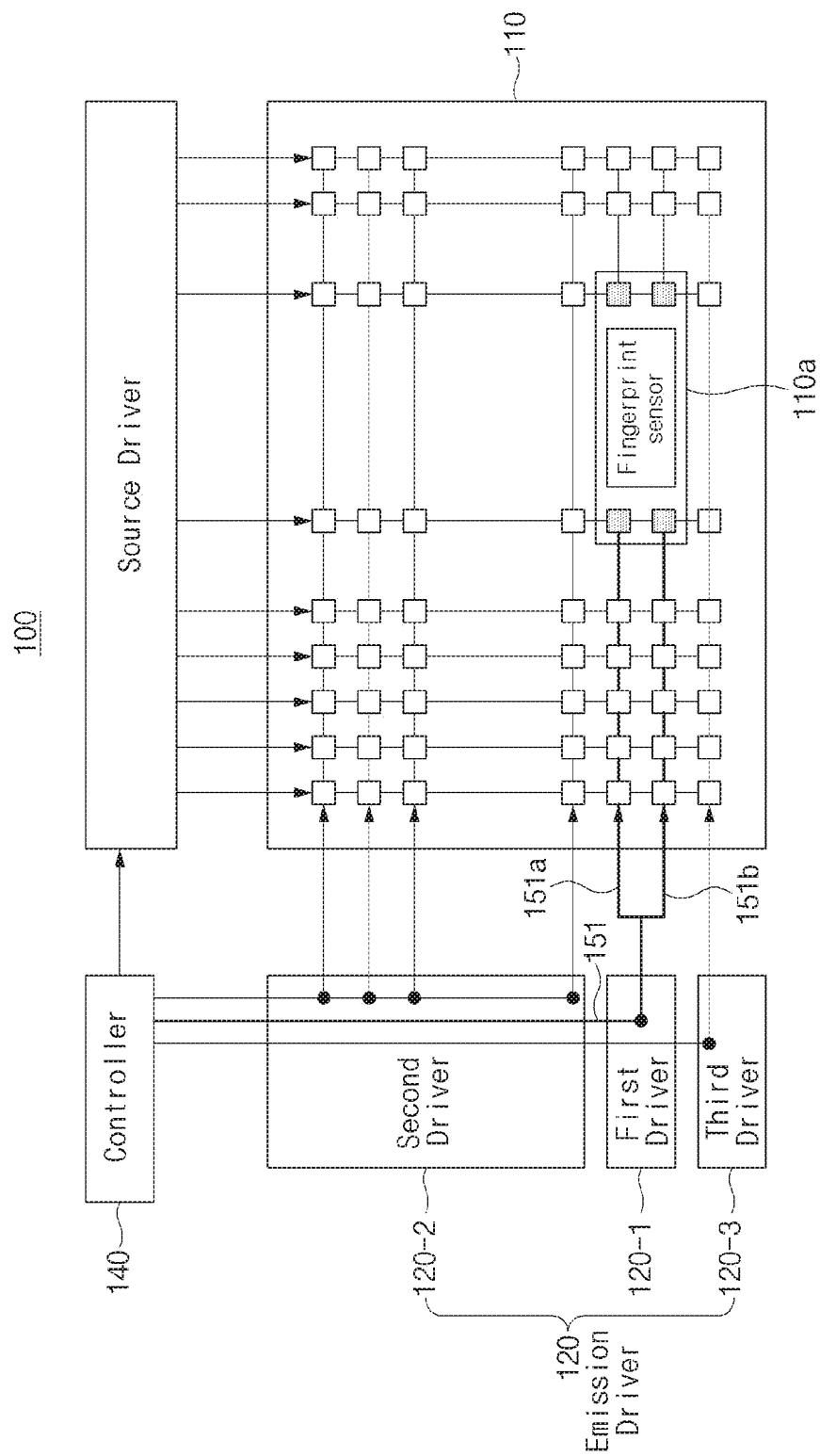
FIG. 5 is a block diagram illustrating a display that allow the pixels included in a first pixel group to simultaneously emit light according to an embodiment.

FIG. 5 is a block diagram illustrating a display that allow the pixels included in a first pixel group to simultaneously emit light according to an embodiment. The display shown in FIG. 5 is another embodiment of the display shown in FIG. 4.

Referring to FIG. 5, the line 151 may be divided into two sub-lines 151*a* and 151*b* and connected to the first pixel group 110*a*. For example, some pixels of the first pixel group 110*a* may be connected to the first sub-line 151*a* and other pixels of the first pixel group 110*a* may be connected to the second sub-line 151*b*. Although the line 151 is illustrated as being divided into two sub-lines 151a and 151b in FIG. 5, the line 151 may be divided into three sub-lines or more.

According to an embodiment of the disclosure, when a finger touches the fingerprint sensing area, the controller 140 may apply an enable signal to the first pixel group 110a. When the enable signal is applied, the first pixel group 110a may emit light. Because the line 151 is divided into the two sub-lines 151a and 151b, the enable signal may be simultaneously transmitted to the first pixel group 110a through the two sub-lines 151a and 151b. Because the enable signal is simultaneously transmitted to the first pixel group 110a through the sub-lines 151a and 151b, the pixels included in the first pixel group 110a may simultaneously emit light.

According to an embodiment, the controller 110 may prevent the second pixel group from emitting light when the first pixel group 110a emits light. The operation of preventing the second group of pixels from emitting light may be similar to, for example, the operation described in FIG. 4.

Figure 6:
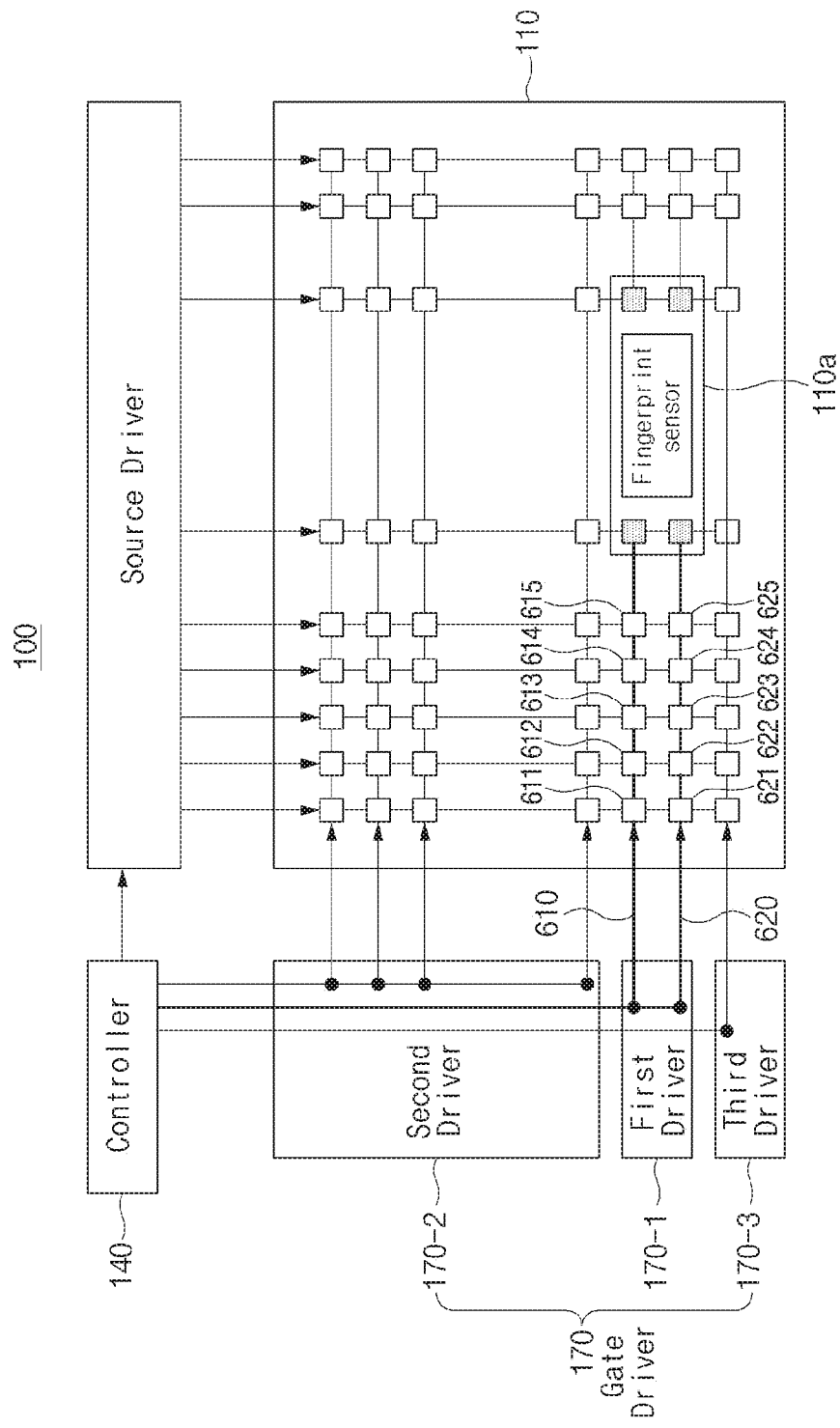
FIG. 6 illustrates a block diagram of a display in which a gate driver according to one embodiment is divided into a plurality of drivers.

FIG. 6 illustrates a block diagram of a display in which a gate driver according to one embodiment is divided into a plurality of drivers. The embodiment shown in FIG. 6 differs from the embodiment shown in FIG. 4 in that a gate driver 170 may be divided into a plurality of drivers.

According to an embodiment of the disclosure, when a finger touches the fingerprint sensing area, the controller 140 outputs an enable signal to the first pixel group 110a. When the enable signal is applied, the first pixel group 110a may emit light. The enable signal may be different from the enable signal described with reference to FIG. 4. For example, the enable signal may control a gate voltage of a scan transistor included in each of the pixels as a signal applied to the gate driver 170.

According to an embodiment, the controller 140 may turn off pixels 611, 612, 613, 614, and 615 that are not included in the first pixel group 110a among the pixels connected to a line 610. In addition, the controller 140 may turn off pixels 621, 622, 623, 624, and 625 that are not included in the first pixel group 110a among the pixels connected to a line 620. For example, when the controller 140 applies the enable signal to the first pixel group 110a, the controller 140 may apply a disable signal to the pixels 611 to 615 and 621 to 625 to prevent the pixels 611 to 615 and 621 to 625 from emitting light. According to an embodiment, the pixels 611 to 615, 621 to 625 and the first pixel group 110a may be connected to the first driver 170-1 through different lines.

According to an embodiment, when the first pixel group 110a emits light, the controller 140 may apply a disable signal to the second driver 170-2 and the third driver 170-3, thereby preventing the pixels from emitting light. The operation of applying the disable signal to the second driver 170-2 and the third driver 170-3 to prevent the pixels from emitting light may be similar to the operation described with reference to FIG. 4.

According to an embodiment of the disclosure, when the fingerprint is sensed, the amount of consumed current may be small because the enable signal is applied through the first driver.

Figure 7:
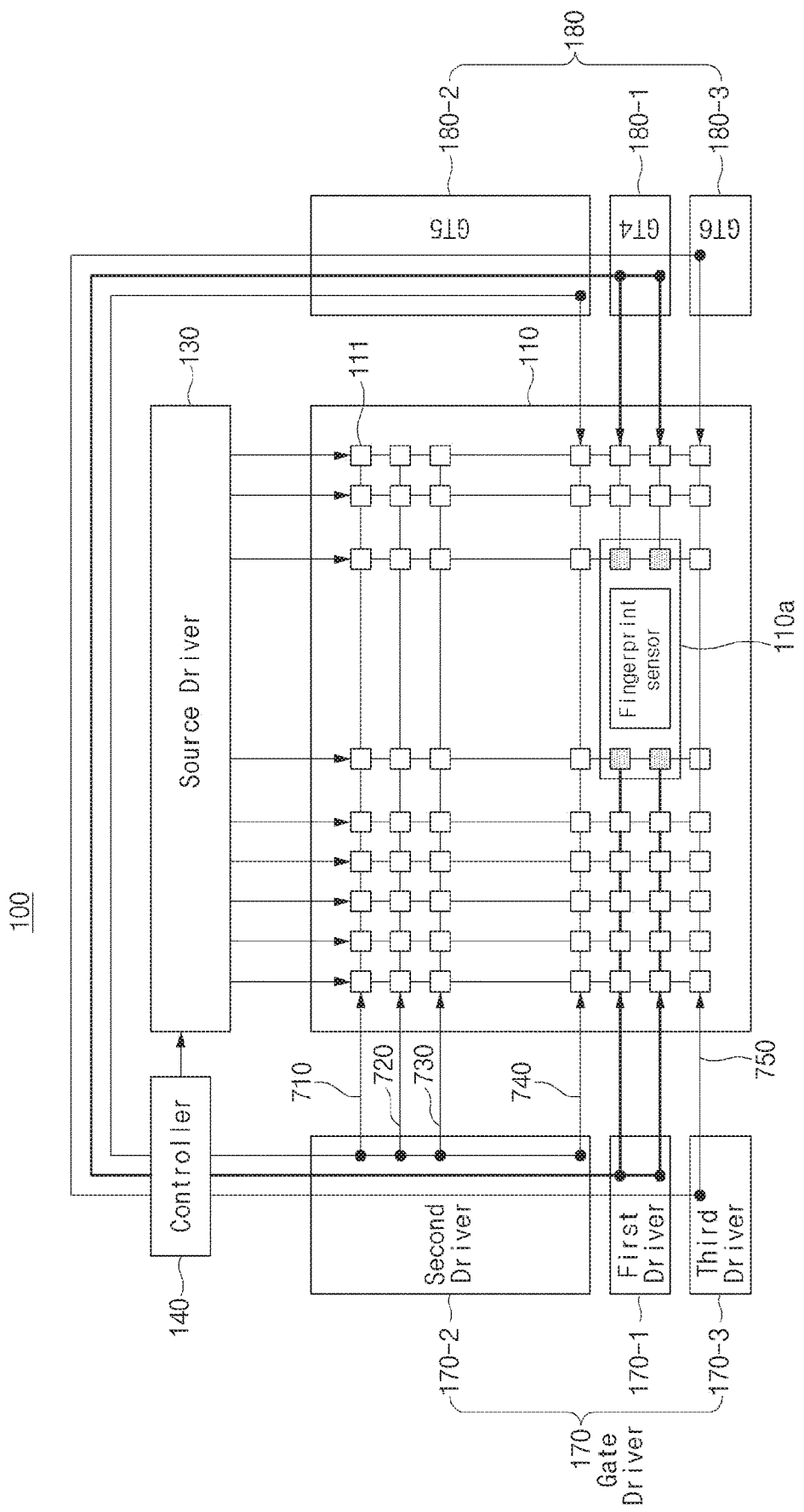
FIG. 7 is a block diagram of a display to which a gate driver connected to a first pixel group is added according to an embodiment.

FIG. 7 is a block diagram of a display to which a gate driver connected to a first pixel group is added according to an embodiment. The embodiment shown in FIG. 7 is another embodiment of the display 100 shown in FIG. 6.

Referring to FIG. 7, the display 100 may include a first gate driver 170 and a second gate driver 180. The second gate driver 180 may be connected to the pixels connected to the first gate driver 170.

According to an embodiment, as shown in FIG. 7, each of the first and second gate drivers 170 and 180 may be divided into a plurality of drivers. For example, the first gate driver 170 is divided into first to third drivers 170-1 to 170-3, and the second gate driver 180 is divided into fourth to sixth drivers 180-1 to 180-3.

According to an embodiment of the disclosure, the fourth driver 180-1 may be connected to the pixels (or the first pixel group 110a) connected to the first driver 170-1. Because the fourth driver 180-1 is also connected to the first pixel group 110a, the fourth driver 180-1 may control whether to allow the first pixel group 110a to emit light. The fifth and sixth drivers 180-2 and 180-3 may be connected to the pixels connected to the second and third drivers 170-2 and 170-3, respectively. Accordingly, the fifth and sixth drivers 180-2 and 180-3 may control whether to allow the pixels included in the second pixel group to emit light.

According to an embodiment of the disclosure, when the first driver 170-1 applies an enable signal to the first pixel group 110a, the controller 140 may allow the fourth driver 180-1 to apply the enable signal to the first pixel group 110a. When the enable signal is applied, the first pixel group 110a may emit light. Because the first pixel group 110a is spaced apart from the first and fourth drivers 170-1 and 180-1, when a signal is applied through one of the first and fourth drivers 170-1 and 180-1, the intensity of the signal reaching the first pixel group 110a may be weak. Thus, the controller 140 may simultaneously apply a signal to the first pixel group 110a through the first and fourth drivers 170-1 and 180-1.

According to an embodiment, when the first pixel group 110a is allowed to emit light, the controller 140 may allow the fifth and sixth drivers 180-2 and 180-3 to apply a disable signal to the second pixel group. When the disable signal is applied, the second pixel group may not emit light. For example, the controller 140 may allow the second and fifth drivers 170-2 and 180-2 to apply a disable signal to the pixels connected through lines 710 to 740. In addition, the controller 140 may allow the third and sixth drivers 170-3 and 180-3 to apply a disable signal to the pixels connected through the line 750.

According to an embodiment of the disclosure, a gate driver may be added to apply a signal to each pixel, thereby applying a strong signal to each pixel.

Figure 8A:
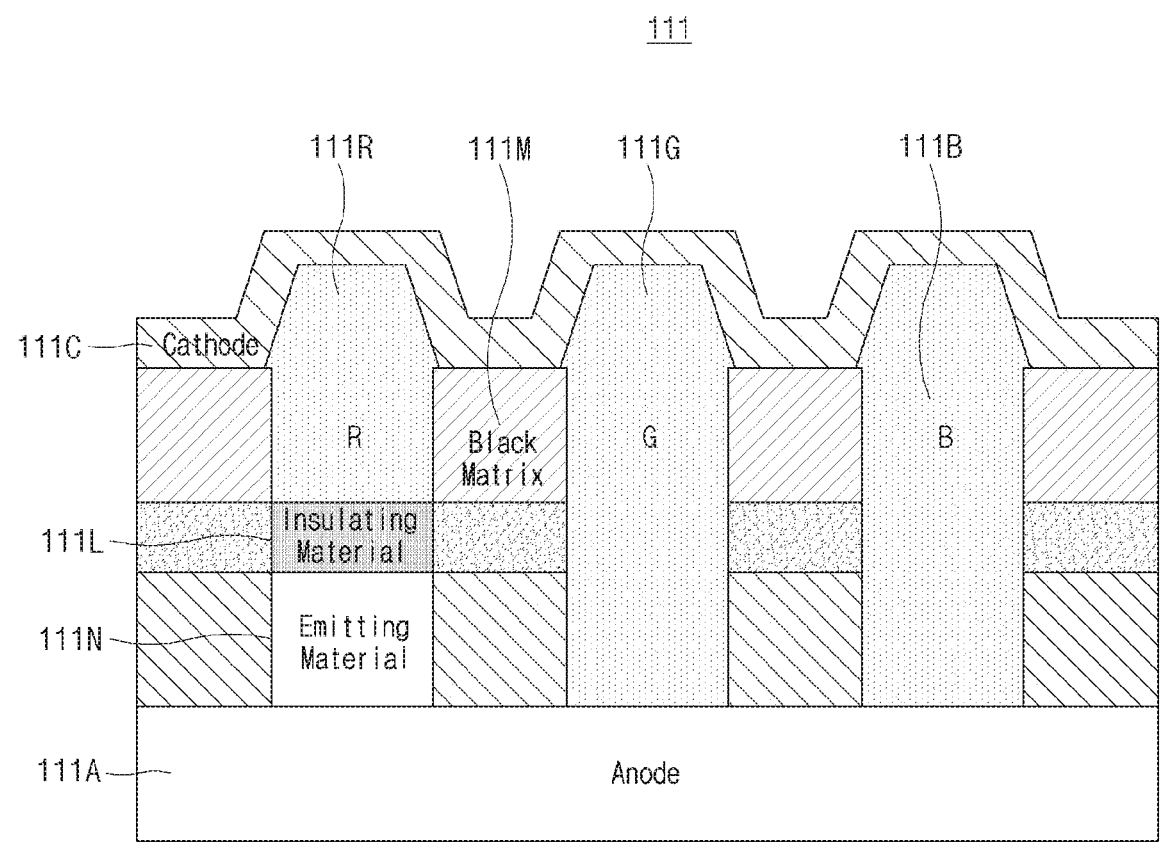
FIG. 8A is a sectional view of a pixel according to an embodiment.
Figure 8B:
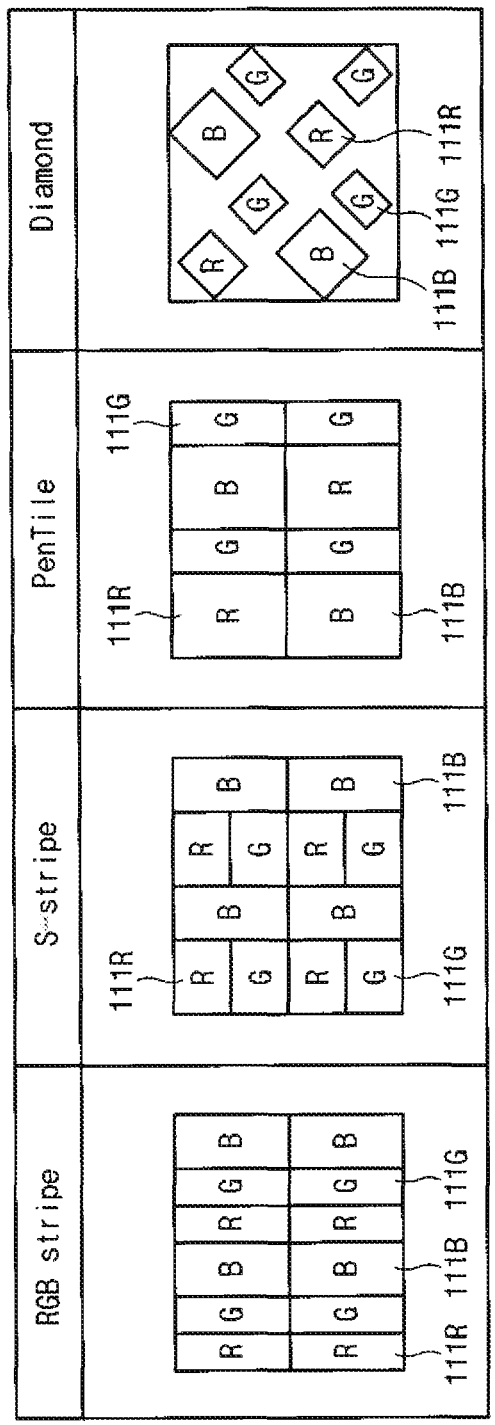
FIG. 8B is a plane view of a pixel according to an embodiment.
Figure 8C:
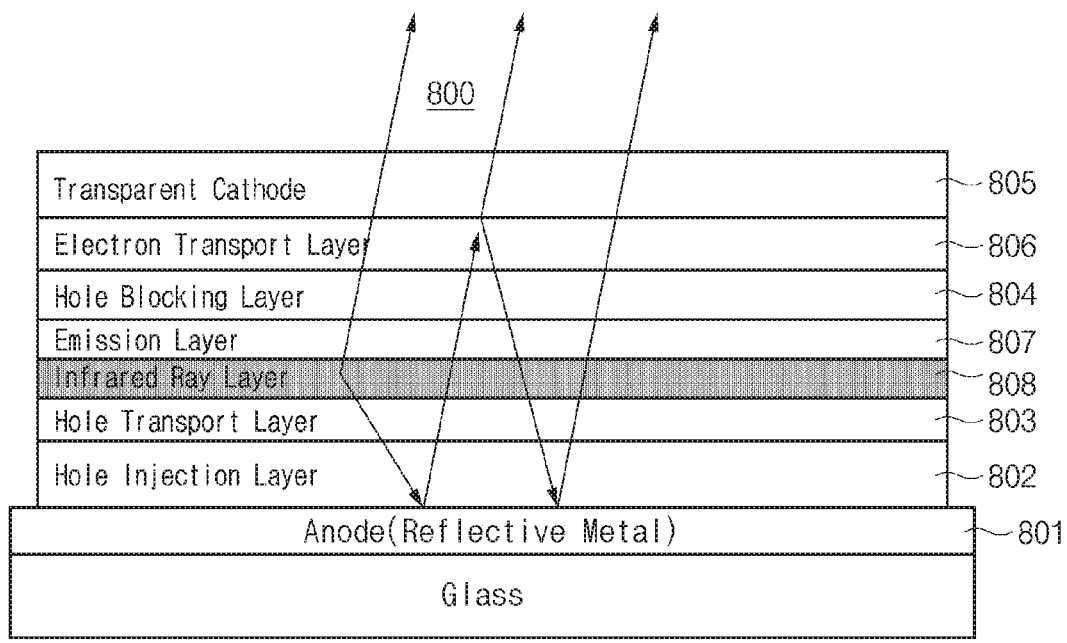
FIG. 8C is a sectional view of a light emitting diode according to an embodiment.
Figure 8D:
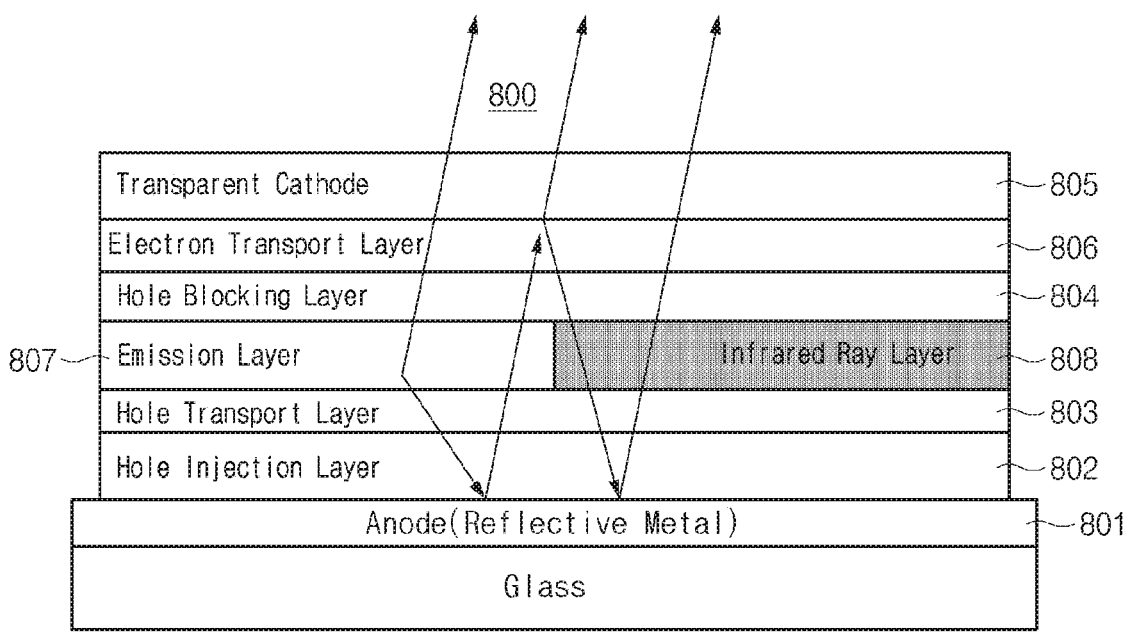
FIG. 8D is a sectional view of a light emitting diode according to another embodiment.

FIG. 8A is a sectional view of a pixel according to an embodiment. FIG. 8B is a plane view of a pixel according to an embodiment. FIG. 8C is a sectional view of a light emitting diode according to an embodiment. FIG. 8D is a sectional view of a light emitting diode according to another embodiment.

Referring to FIG. 8A, the pixel 111 includes an anode 111A, a cathode 111C, a light emitting material 111N, a plurality of sub pixels 111R, 111G, and 111B, a black matrix 111M, and an insulating material 111L.

According to an embodiment of the disclosure, the light emitting material 111N may emit light of a first wavelength when a voltage is applied to the anode 111A and the cathode 111C. For example, the light of the first wavelength may correspond to an infrared ray. The infrared ray emitted from the light emitting material 111N may be reflected by the finger touching the cover glass and input to the fingerprint sensor.

According to an embodiment, the light emitting material 111N may be arranged under the red sub-pixel 111R. When the light emitting material 111N is arranged under the red sub-pixel 111R, the wavelengths of the light emitted from the light emitting material 111N and the sub-pixels 111R, 111G, and 111B may be continuous. For example, among visible light, red light may have a longer wavelength than green light and blue light. In addition, the wavelength of the infrared ray may be longer than that of the red light. Accordingly, when the light emitting material 111N is arranged under the red sub-pixel 111R, the wavelength of the light emitted from the light emitting material 111N and the sub-pixels 111R, 111G, and 111B may be continuous.

According to an embodiment of the disclosure, when a voltage is applied to the cathode 111C and the anode 111A, the red sub-pixel 111R, the green sub-pixel 111G and the blue sub-pixel 111B, may emit red series light, green series light, and blue series light, respectively. According to an embodiment, the red sub-pixel 111R, the green sub-pixel 111G, and the blue sub-pixel 111B may be connected to the light emitting material 111N through another line. Because the sub-pixels 111R, 111G and 111B and the light emitting material 111N are connected to each other through different lines, whether the sub-pixels 111R, 111G and 111B emit light and whether the light emitting material 111N emits light may be different. For example, when the light emitting material 111N emits light, the sub-pixels 111R, 111G, and 111B may not emit light.

The black matrix 111M (black matrix) according to an embodiment of the disclosure may be arranged between each sub-pixel. For example, the black matrix 111M may be arranged between the red sub-pixel 111R and the green sub-pixel 111G, and between the green sub-pixel 111G and the blue sub-pixel 111B. The black matrix 111M may prevent the light emitted from each sub-pixel from mixing, thereby enhancing visibility.

According to an embodiment of the disclosure, the insulating material 111L may be arranged between the red sub-pixel 111R and the light emitting material 111N. The insulating material 111L may electrically separate the red sub-pixel 111R from the light emitting material 111N.

Referring to FIG. 8B, the pixel 111 may be classified into one of an RGB stripe structure, an s-stripe structure, a pentile structure, and a diamond structure depending on the arrangement form of subpixels. In the case of the RGB stripe structure, the red sub-pixel 111R, the green sub-pixel 111G, and the blue sub-pixel 111B may be arranged in order. In the case of the s-stripe structure, the red sub-pixel 111R and the green sub-pixel 111G may be arranged next to the blue sub-pixel 111B, respectively.

In the case of the pentile structure, the green sub-pixel 111G may be repeatedly arranged between the red sub-pixel 111R and the blue sub-pixel 111B. In this case, the sizes of the red sub-pixel 111R and the blue sub-pixel 111B may be larger than the size of the green sub-pixel 111G. In the case of the diamond structure, two subpixels may be arranged in each quadrant when the pixel is quadrupled. For example, the red sub-pixel 111R and the green sub-pixel 111G may be arranged in the area, and the blue sub-pixel 111B and the green sub-pixel 111G may be arranged in the area.

Referring to FIGS. 8C and 8D, a light emitting diode 800 may include an anode 801, a hole injection layer (HIL) 802, a hole transport layer (HTL) 803, a hole blocking layer (HBL) 804, a cathode 805, an electron transport layer 806, an emission layer (EML) 807, and an infrared ray (IR) layer 808.

The anode 801 may provide holes to the light emitting diode 800. For example, the anode 801 may inject holes through the HIL 802. The HTL 803 may transmit holes injected through the HIL 802 to the EML 807. In this case, the HBL 804 may prevent the holes from moving to the ETL 806 and the cathode 805.

The cathode 805 may provide electrons to the light emitting diode 800. For example, the electrons provided by the cathode 805 may be transferred to the EML 807 by the ETL 806.

When the holes and electrons are transferred to the EML 807, the holes and electrons may be combined with each other in the EML 807. The energy generated when the holes and electrons are combined may make the light emitting material of the EML 807 excited. The light emitting material in the excited state may emit light energy while returning to the ground state again.

According to an embodiment, the IR layer 808 may emit infrared rays. For example, the energy generated when the holes and the electrons are combined may allow the IR layer 808 to emit infrared rays. Because the anode 801 may be formed of a metal reflecting light and the cathode 805 may be formed of a transparent electrode, the infrared rays emitted from the IR layer may be reflected by the anode 801 and diverge through the cathode 805.

Referring to FIG. 8A, the IR layer 808 may be arranged under the EML 807. In this case, the infrared ray diverging from the IR side and the infrared ray reflected by the anode 801 may pass through the EML 807 and diverge to an outside of the light emitting diode 800. Referring to FIG. 8B, the IR layer 808 may be arranged in the same layer as the EML 807. In this case, both light diverging from the EML 807 and infrared rays diverging from the IR layer 808 may diverge to an outside of the light emitting diode 800 through the cathode 805.

Figure 9:
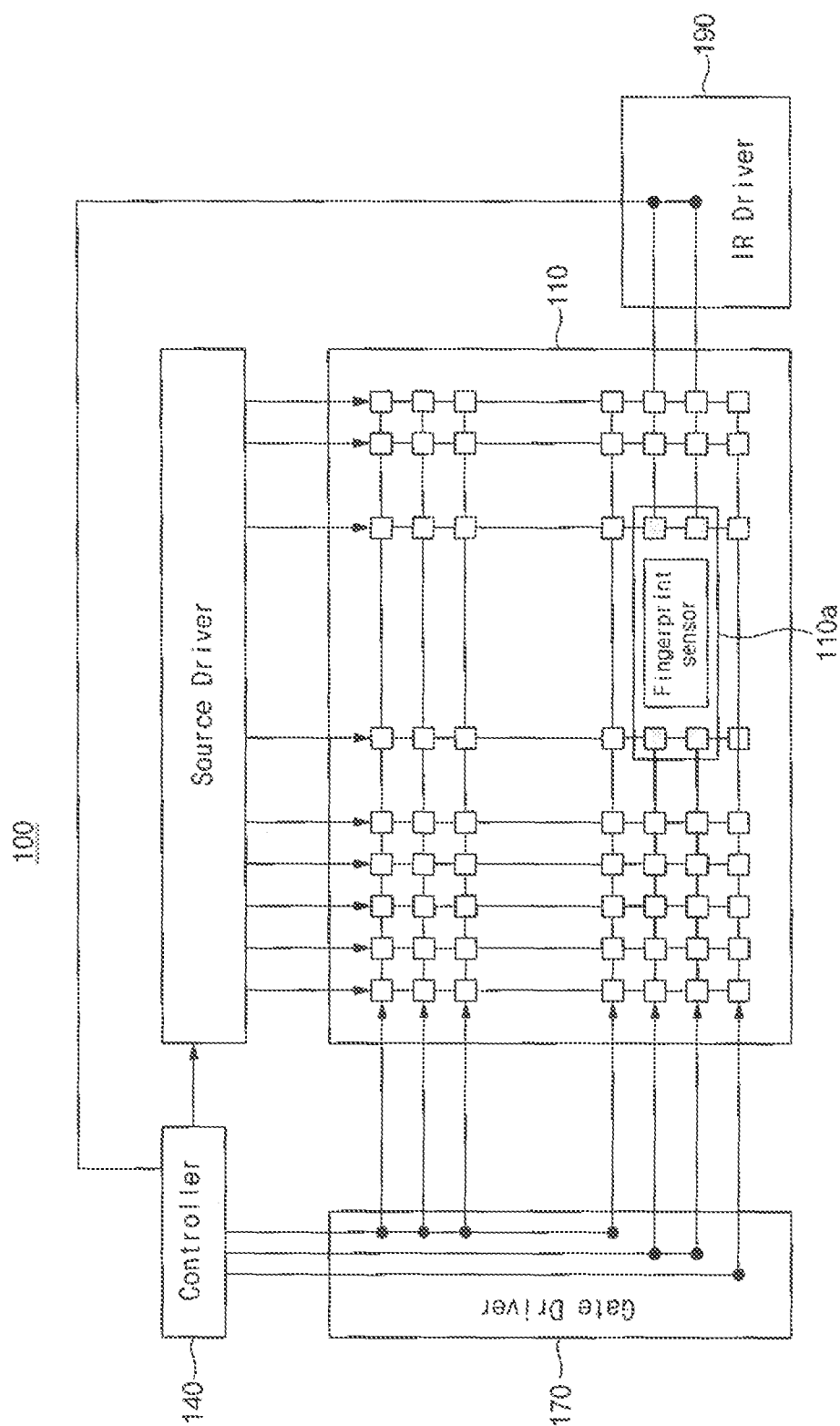
FIG. 9 is a view illustrating a display which controls such that a light emitting material according to an embodiment emits infrared rays.

FIG. 9 is a view illustrating a display which controls such that a light emitting material according to an embodiment emits infrared rays.

Referring to FIG. 9, the display 100 may include the gate driver 170 and an IR driver 190. The gate driver 170 may be connected to the sub-pixels included in the first pixel group 110a. The IR driver 190 may be connected to a light emitting material included in the first pixel group 110a.

According to an embodiment of the disclosure, when a finger touches the fingerprint sensing area, the controller 140 may control to allow the IR driver 190 to apply an enable signal to the light emitting material such that the light emitting material emits infrared rays. The infrared rays emitted from the light emitting material may be reflected by the finger touching the cover glass and input to the fingerprint sensor.

According to an embodiment, when the IR driver 190 applies the enable signal to the light emitting material, the controller 140 may allow the gate driver 170 to apply a disable signal to the sub-pixels. When the disable signal is applied, the sub-pixels may not emit light. In addition, the controller 140 may allow the gate driver 170 to apply the disable signal to the second pixel group when the IR driver 190 applies the enable signal. When the disable signal is applied, the second pixel group may not emit light.

According to an embodiment of the disclosure, because only the IR driver is driven when sensing a fingerprint, the amount of the consumed current may be reduced.

Figure 10:
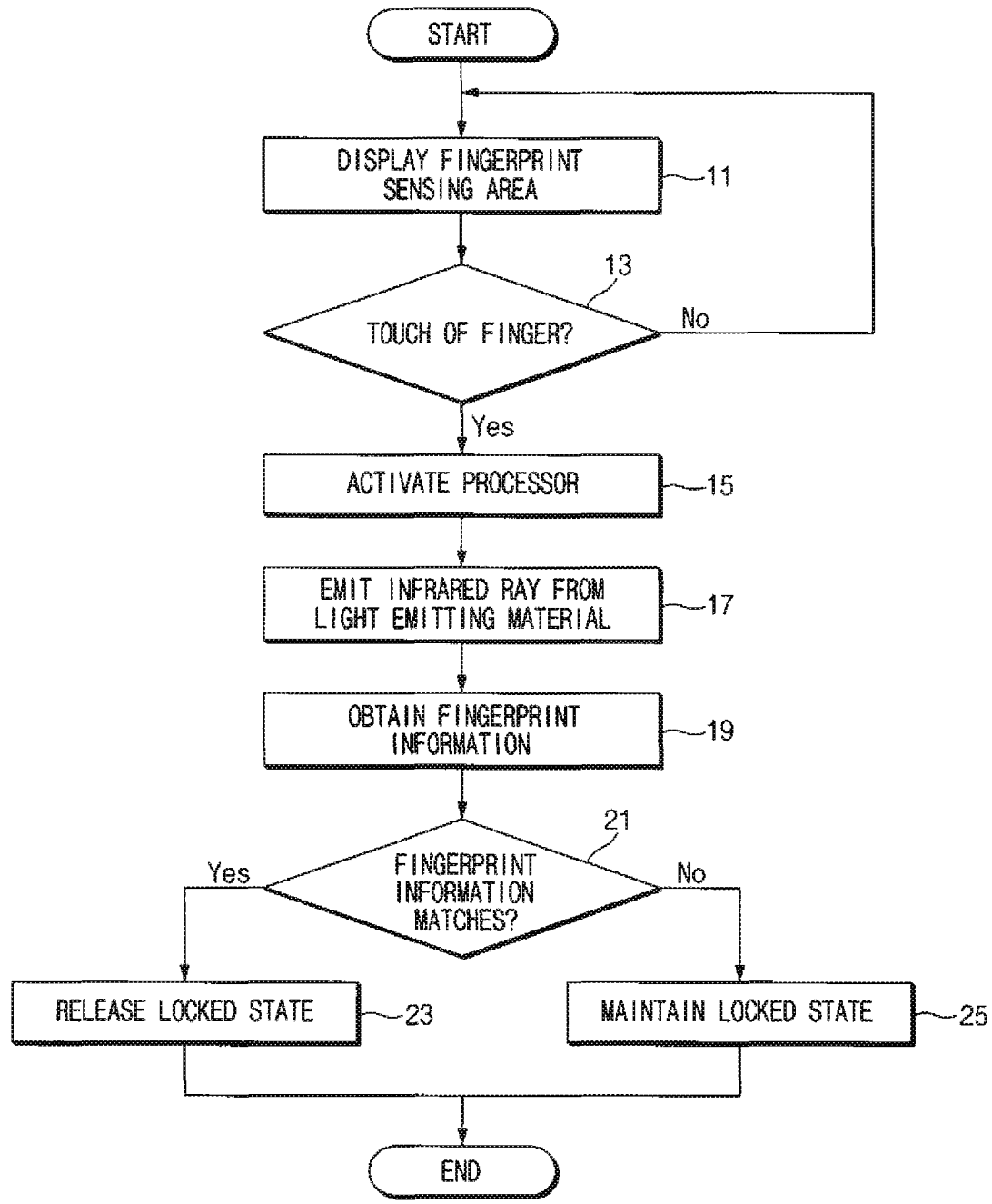
FIG. 10 is a flowchart illustrating an operation of an electronic device according to another embodiment.

FIG. 10 is a flowchart illustrating an operation of an electronic device according to another embodiment. The flowchart illustrated in FIG. 10 is a flowchart illustrating an operation of the electronic device including the display 100 shown in FIG. 9. Unless specified otherwise, the description of the electronic device 1000 described with reference to FIGS. 1 to 3 may be applied to the electronic device which will be described below with reference to FIG. 10.

Referring to FIG. 10, in operation 11, the electronic device 1000 may display a fingerprint sensing area on the cover glass. When the fingerprint sensing area is displayed, in operation 13, the electronic device 1000 may determine whether the finger is in contact with the fingerprint sensing area. Unless specified otherwise, the description of operations 301 and 303 shown in FIG. 3 may be applied to operations 11 and 13.

When the finger touches the fingerprint sensing area, in operation 15, the electronic device 1000 may enter an idle state (or an active state). When the electronic device 1000 enters the active state, in operation 17, the electronic device 1000 may apply an enable signal to the light emitting material to control the light emitting material to emit infrared rays. The infrared rays emitted from the light emitting material may be reflected by the finger touching the cover glass and input to the fingerprint sensor. In this case, the electronic device 1000 may control the subpixels not to emit light by applying a disable signal to the subpixels. When the light emitting material emits infrared rays, in operation 19, the electronic device 1000 may obtain fingerprint information based on the light input to the fingerprint sensor. For example, the processor 1130 may obtain the number of feature points, distribution of the feature points, and the like.

When the fingerprint information is obtained, in operation 21, the electronic device 1000 may compare the fingerprint information stored in the memory with the fingerprint information obtained through the fingerprint sensor to determine whether the fingerprint information matches. When the fingerprint information matches, in operation 23, the electronic device 1000 may release the locked state of the electronic device. When the fingerprint information does not match, in operation 25, the electronic device 1000 may maintain the locked state of the electronic device.

Figure 11A:
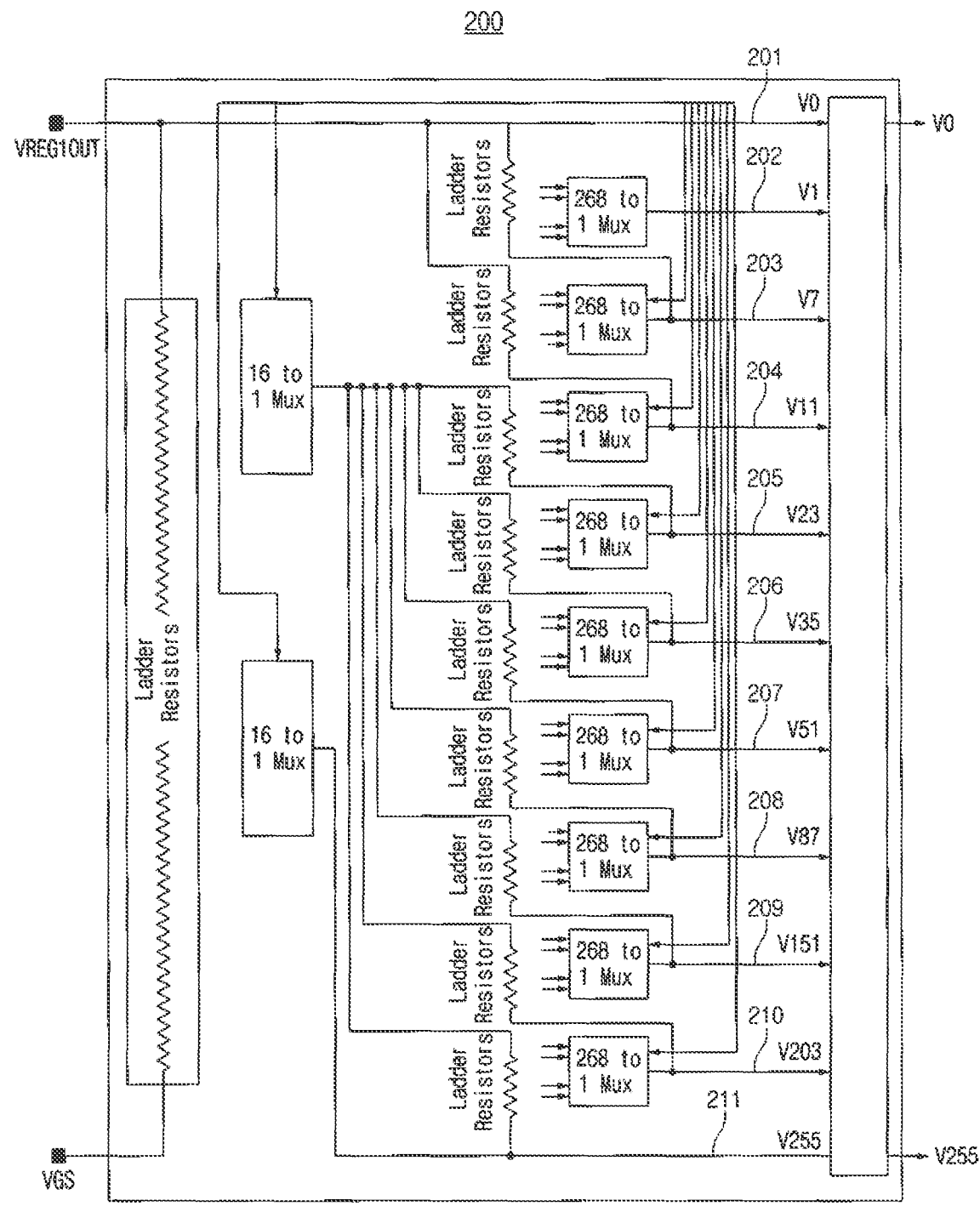
FIG. 11A is a detailed circuit diagram of a gamma block according to an embodiment.
Figure 11B:
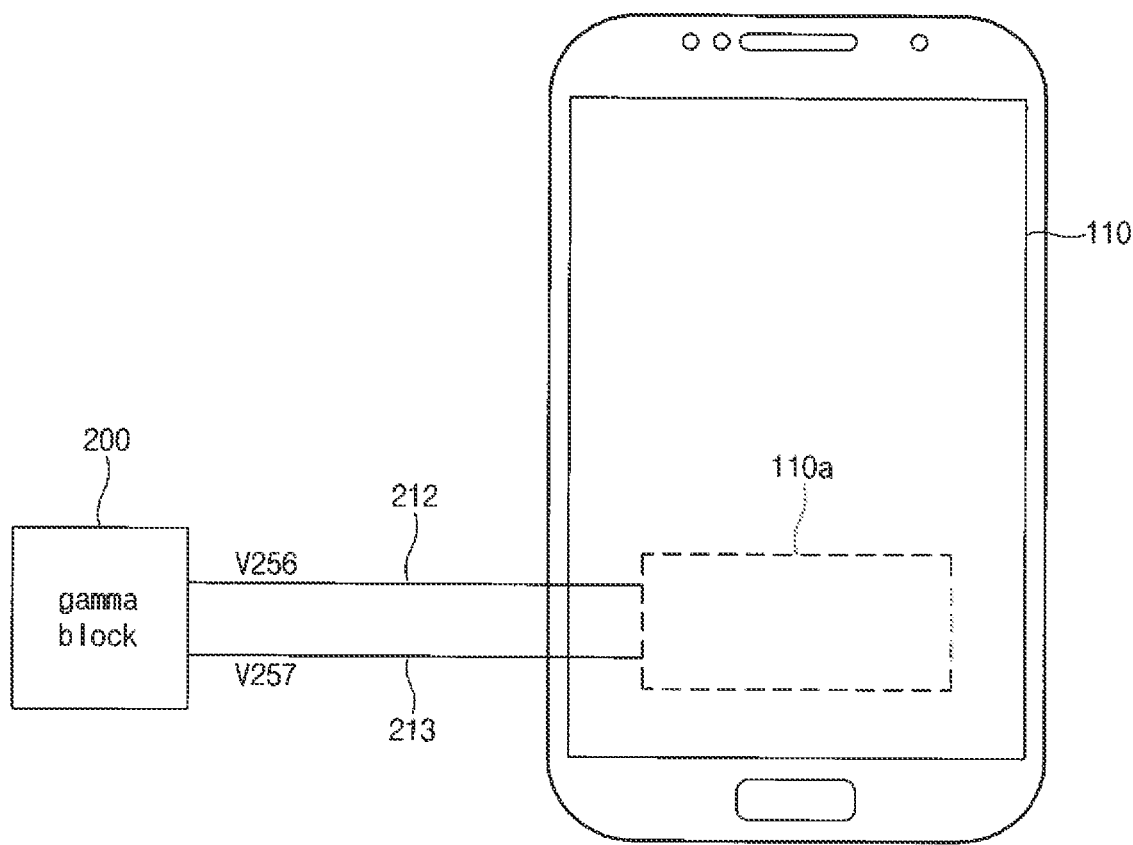
FIG. 11B is a view illustrating a gamma block connected to a first pixel group according to an embodiment.

FIG. 11A is a detailed circuit diagram of a gamma block according to an embodiment. FIG. 11B is a view illustrating a gamma block connected to a first pixel group according to an embodiment.

Referring to FIG. 11A, a gamma block 200 (or a gamma controller) may output a grayscale voltage. The grayscale voltage corresponds to the brightness (e.g., a luminous flux) of the display panel, and the grayscale voltage applied to the display panel may be changed corresponding to the brightness of the display panel. For example, when the brightness of the display panel is divided into 256 levels, the grayscale voltage may be divided into 256 levels and applied to the display panel. In FIG. 10A, when the brightness of the display panel is set to level 7, the gamma block 200 may output V7 through a line 203.

Referring to FIG. 11B, the gamma block 200 may be connected to the display panel 110. The gamma block 200 may be connected to the display panel 110 to output a grayscale voltage, so that the gamma block 200 may adjust luminous flux of the display panel 110. According to an embodiment, the gamma block 200 may be connected to the first pixel group 110a to allow the first pixel group 110a to emit light at first luminous flux, and connected to the second pixel group to allow the second pixel group to emit light at second luminous flux. Because the first luminous flux is larger than the second luminous flux, the brightness of light emitted from the first pixel group 110a may be brighter than that of the light emitted from the second pixel group.

According to an embodiment, the gamma block 200 may include a line capable of outputting a voltage in excess of V255. For example, the gamma block 200 may include lines 212 and 213 capable of outputting V256 and V257. The lines 212 and 213 among the lines 201 to 213 included in the gamma block 200 may be connected to the first pixel group 110a and the remaining lines 201 to 211 may be connected to the second pixel group. Thus, because a voltage exceeding V255 may be applied to the first pixel group 110a and a voltage equal to or lower than V255 may be applied to the second pixel group, the brightness of light emitted from the first pixel group 110a may be brighter than that of the light emitted from the second pixel group.

Although the gamma block 200 that adjusts the voltage applied to the display panel 110 is shown in FIG. 11B, the controller may adjust the voltage applied to the display panel 110. For example, the controller may apply a higher voltage to the first pixel group 110a than the second pixel group, such that the brightness of light emitted from the first pixel group 110a is greater than that of light emitted from the second pixel group.

According to an embodiment of the disclosure, when the fingerprint is sensed, the first pixel group is made brighter than the second pixel group, such that the amount of current required may be smaller than that required for brightening all the pixels included in the display panel. Thus, according to an embodiment of the disclosure, the current consumed for obtaining fingerprint information may be reduced.

According to an embodiment of the disclosure, a display arranged over a fingerprint sensor may include a cover glass, a display panel arranged below the cover glass, a first driver that applies a signal to a first pixel group arranged in a first area corresponding to the fingerprint sensor on the display panel, a second driver that applies a signal to a second pixel group arranged in a second area that does not overlap the first area on the display panel, and a controller that causes the first driver to apply an enable signal to the first pixel group to enable the first pixel group to emit light when a finger touches a fingerprint sensing area corresponding to the fingerprint sensor on the cover glass.

According to an embodiment of the disclosure, the controller may be set to cause the second driver to transmit a disable signal to the second pixel group such that the second pixel group does not emit light when the finger touches the fingerprint sensing area.

According to an embodiment of the disclosure, the controller may be set to cause the first driver to apply the enable signal to pixels of the first pixel group connected through a first line, and cause the first driver to apply the enable signal to pixels connected through a second line when the first pixel group emits light.

According to an embodiment of the disclosure, the controller may be set to cause the first driver to apply the enable signal to the pixels connected through the first line and the pixels connected through the second line such that the pixels connected through the first line and the pixels connected through the second line emit light.

According to an embodiment of the disclosure, the display may further include a third driver connected to the first pixel group, and the controller may be set to cause the third driver to apply the enable signal to the first pixel group when the finger touches the fingerprint sensing area.

According to an embodiment of the disclosure, the driver may correspond to one of a gate driver and an emission driver.

According to an embodiment of the disclosure, the controller may be set to cause the first driver to apply a preset voltage to the first pixel group.

According to an embodiment of the disclosure, when the finger touches the fingerprint sensing area, the controller may be set to cause the first pixel group to emit light at a first luminous flux and cause the second pixel group to emit light at a second luminous flux, where the first luminous flux and the second luminous flux have different values.

According to an embodiment of the disclosure, a display arranged over a fingerprint sensor may include a cover glass, a display panel arranged below the cover glass, a driver connected to at least one pixel arranged in an area corresponding to the fingerprint sensor on the display panel, and a controller electrically connected to the driver, wherein each of the at least one pixel connected to the driver includes a light emitting material that emits light having a first wavelength and a plurality of sub-pixels that emit light having a second wavelength, and wherein the controller is set to allow the driver to apply an enable signal to the light emitting material when a finger touches a fingerprint sensing area corresponding to the fingerprint sensor on the cover glass, thereby allowing the light emitting material to emit the light having the first wavelength.

According to an embodiment of the disclosure, the controller may be set to allow the driver to apply a disable signal to the plurality of sub-pixels such that the plurality of sub-pixels are prevented from emitting the light having the second wavelength when the finger does not touch the fingerprint sensing area.

According to an embodiment of the disclosure, the driver may be connected to the light emitting material through a first line and connected to the plurality of sub-pixels through a second line, where the controller is set to allow the driver to apply the enable signal to light emitting material through the first line and to transmit a disable signal to the plurality of sub-pixels through the second line when the finger touches the fingerprint sensing area.

According to an embodiment of the disclosure, the light having the first wavelength may correspond to an infrared ray and the light having the second wavelength may correspond to a visible ray.

According to an embodiment of the disclosure, each of the at least one pixel may include a first sub-pixel and a second sub-pixel which are spaced apart from each other while a black matrix is interposed therebetween, where the light emitting material is arranged below the first sub-pixel.

According to an embodiment of the disclosure, each of the at least one pixel may further include an insulating material which is arranged between the first sub-pixel and the light emitting material to electrically separate the first sub-pixel from the light emitting material.

According to an embodiment of the disclosure, the first sub-pixel may emit red series light.

According to an embodiment of the disclosure, an electronic device may include a housing, a display arranged in the housing, a cover arranged over the display, an array of touch-sensor electrodes arranged between the cover and the display or inside the display to sense a touch on the cover, a fingerprint sensor arranged between the display and the housing and having a fingerprint sensing area arranged in a view area of the display, at least one processor placed in the housing and electrically connected to the display, the array of touch-sensor electrodes, and the fingerprint sensor, and at least one memory placed in the housing, electrically connected to the processor, and configured to store instructions, wherein, the instructions, when executed, cause the processor to: provide a graphic user interface (GUI) for indicating a location of the fingerprint sensor on the display, receive data for sensing a finger of a user in proximity to or in contact with the fingerprint sensing area, control the display to emit light in or around the fingerprint sensing area when the finger of the user is sensed, control the fingerprint sensor to sense a fingerprint of the finger based on light of a part of the light reflected by the finger, and perform authentication by using the sensed fingerprint.

According to an embodiment of the disclosure, the at least one processor may include a display drive integrated circuit (IC) and an application processor (AP).

According to an embodiment of the disclosure, the instructions may cause the display drive IC to provide the graphic user interface on the display.

According to an embodiment of the disclosure, the instructions may cause the graphical user interface to be provided in the vicinity of the fingerprint sensing area or the fingerprint sensing area while the display driver IC turns off the remainder of the display.

According to an embodiment of the disclosure, the display may include a first plurality of columns and a second plurality of rows constituting a matrix of pixels, wherein the display drive IC may include a source driver electrically connected to the first plurality of columns, at least one gate driver electrically connected to the second plurality of rows, and at least one emission circuit electrically connected to the second plurality of rows.

According to an embodiment of the disclosure, the at least one emission circuit may include a first emission circuit electrically connected from a first row to an l-th row, a second emission circuit electrically connected from a (l+1)th row to an m-th row, and a third emission circuit electrically connected from an (m+1)th row to an n-th row which is the last row, where the (l+1)th row to the m-th row cover the fingerprint sensing area.

According to an embodiment of the disclosure, the number of rows connected to the first emission circuit may be greater than the number of rows connected to the second emission circuit.

According to an embodiment of the disclosure, the number of rows connected to the first emission circuit may be greater than the number of rows connected to the third emission circuit.

According to an embodiment of the disclosure, the number of rows connected to the second emission circuit may be greater than the number of rows connected to the third emission circuit.

According to an embodiment of the disclosure, the light may include a visible ray or an infrared ray.

According to an embodiment of the disclosure, the display may include a plurality of organic light emitting diodes (OLEDs) that generate the light.

According to an embodiment of the disclosure, the display may further include a gamma controller that controls the OLED to generate the light to provide a higher luminous flux than the GUI.

According to an embodiment of the disclosure, the instructions may cause the electronic device to be released based on the authentication.

Figure 12:
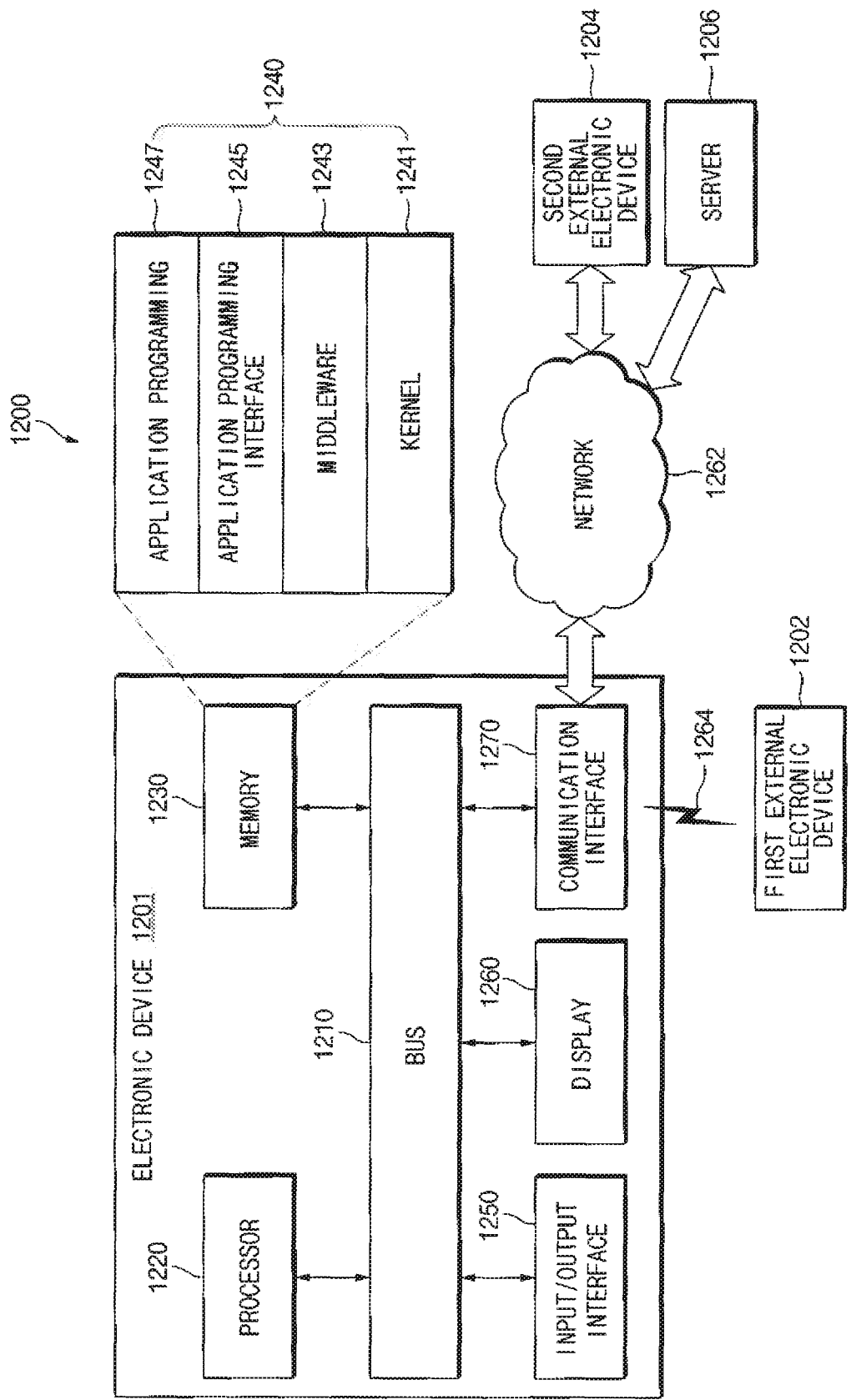
FIG. 12 is a view illustrating an electronic device in a network environment system according to various embodiments.

FIG. 12 illustrates an electronic device in a network environment system, according to various embodiments.

Referring to FIG. 12, according to various embodiments, an electronic device 1201, a first electronic device 1202, a second electronic device 1204, or a server 1206 may be connected each other over a network 1262 or a short range communication 1264. The electronic device 1201 may include a bus 1210, a processor 1220, a memory 1230, an input/output interface 1250, a display 1260, and a communication interface 1270. According to an embodiment, the electronic device 1201 may not include at least one of the above-described components or may further include other component(s).

For example, the bus 1210 may interconnect the above-described components 1210 to 1270 and may include a circuit for conveying communications (e.g., a control message and/or data) among the above-described components.

The processor 1220 may include one or more of a central processing unit (CPU), an application processor (AP), or a communication processor (CP). For example, the processor 1220 may perform an arithmetic operation or data processing associated with control and/or communication of at least other components of the electronic device 1201.

The memory 1230 may include a volatile and/or nonvolatile memory. For example, the memory 1230 may store commands or data associated with at least one other component(s) of the electronic device 1201. According to an embodiment, the memory 1230 may store software and/or a program 1240. The program 1240 may include, for example, a kernel 1241, a middleware 1243, an application programming interface (API) 1245, and/or an application program (or "an application") 1247. At least a part of the kernel 1241, the middleware 1243, or the API 1245 may be referred to as an "operating system (OS)".

For example, the kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete components of the electronic device 1201 so as to control or manage system resources.

The middleware 1243 may perform, for example, a mediation role such that the API 1245 or the application program 1247 communicates with the kernel 1241 to exchange data.

Furthermore, the middleware 1243 may process task requests received from the application program 1247 according to a priority. For example, the middleware 1243 may assign the priority, which makes it possible to use a system resource (e.g., the bus 1210, the processor 1220, the memory 1230, or the like) of the electronic device 1201, to at least one of the application program 1247. For example, the middleware 1243 may process the one or more task requests according to the priority assigned to the at least one, which makes it possible to perform scheduling or load balancing on the one or more task requests.

The API 1245 may be, for example, an interface through which the application program 1247 controls a function provided by the kernel 1241 or the middleware 1243, and may include, for example, at least one interface or function (e.g., an instruction) for a file control, a window control, image processing, a character control, or the like.

The input/output interface 1250 may play a role, for example, of an interface which transmits a command or data input from a user or another external device, to other component(s) of the electronic device 1201. Furthermore, the input/output interface 1250 may output a command or data, received from other component(s) of the electronic device 1201, to a user or another external device.

The display 1260 may include, for example, a liquid crystal display (LCD), a light-emitting diode (LED) display, an organic LED (OLED) display, a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a part of a user's body.

For example, the communication interface 1270 may establish communication between the electronic device 1201 and an external device (e.g., the first electronic device 1202, the second electronic device 1204, or the server 1206). For example, the communication interface 1270 may be connected to the network 1262 over wireless communication or wired communication to communicate with the external device (e.g., the second electronic device 1204 or the server 1206).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1264. The short range communication 1264 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1201 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1262 may include at least one of telecommunications networks, for example, a computer network (e.g., LAN or WAN), an Internet, or a telephone network.

Each of the first and second electronic devices 1202 and 1204 may be a device of which the type is different from or the same as that of the electronic device 1201. According to an embodiment, the server 1206 may include a group of one or more servers. According to various embodiments, all or a portion of operations that the electronic device 1201 will perform may be executed by another or plural electronic devices (e.g., the first electronic device 1202, the second electronic device 1204 or the server 1206). According to an embodiment, in the case where the electronic device 1201 executes any function or service automatically or in response to a request, the electronic device 1201 may not perform the function or the service internally, but, alternatively additionally, it may request at least a portion of a function associated with the electronic device 1201 from another device (e.g., the electronic device 1202 or 1204 or the server 1206). The other electronic device may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Figure 13:
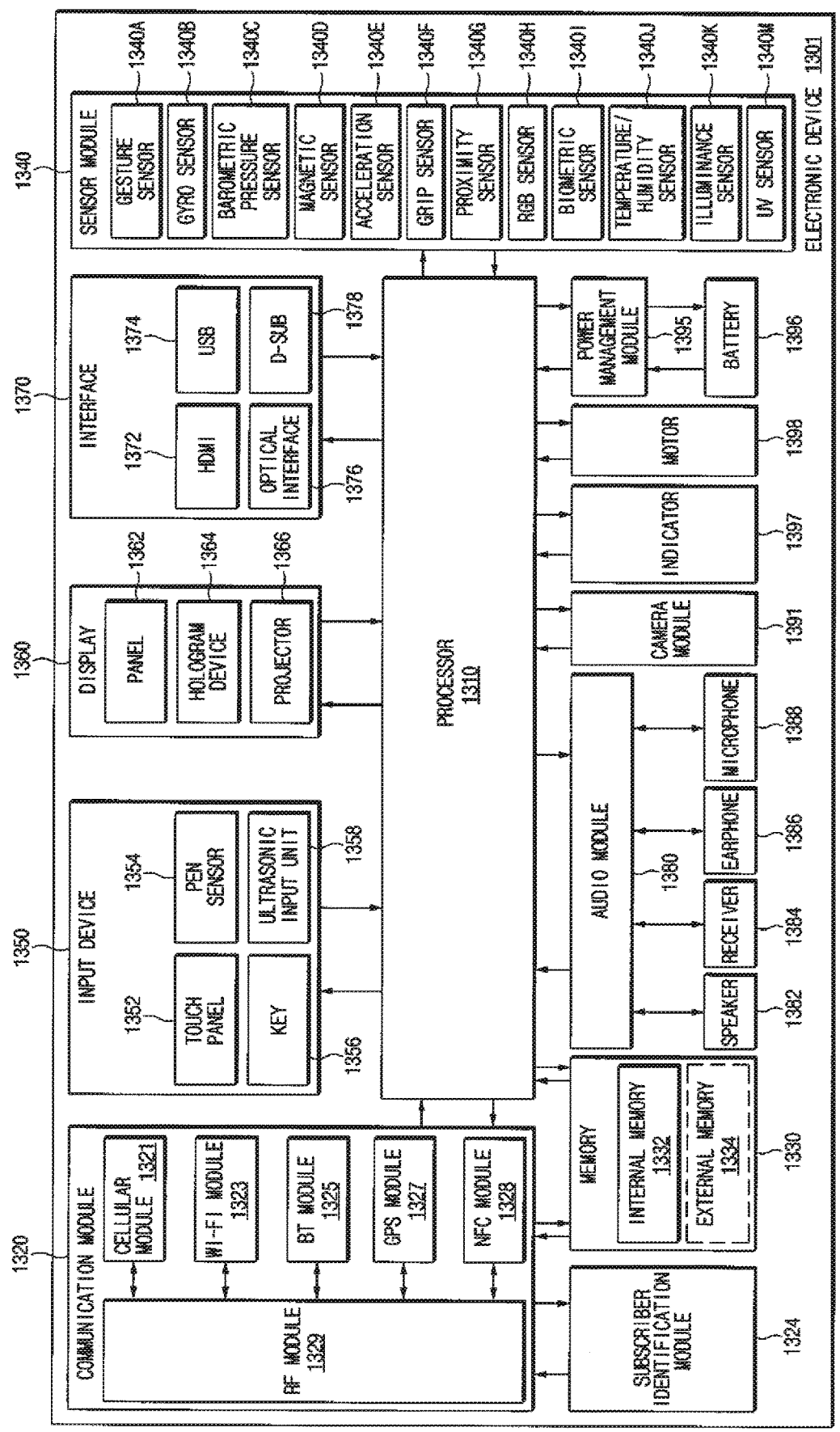
FIG. 13 is a block diagram of an electronic device according to various embodiments.

FIG. 13 illustrates a block diagram of an electronic device, according to various embodiments.

Referring to FIG. 13, an electronic device 1301 may include, for example, all or a part of the electronic device 1201 illustrated in FIG. 12. The electronic device 1301 may include one or more processors (e.g., an application processor (AP)) 1310, a communication module 1320, a subscriber identification module 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an operating system (OS) or an application to control a plurality of hardware or software components connected to the processor 1310 and may process and compute a variety of data. For example, the processor 1310 may be implemented with a System on Chip (SoC). According to an embodiment, the processor 1310 may further include a graphic processing unit (GPU) and/or an image signal processor. The processor 1310 may include at least a part (e.g., a cellular module 1321) of components illustrated in FIG. 13. The processor 1310 may load a command or data, which is received from at least one of other components (e.g., a nonvolatile memory), into a volatile memory and process the loaded command or data. The processor 1310 may store a variety of data in the nonvolatile memory.

The communication module 1320 may be configured the same as or similar to the communication interface 1270 of FIG. 12. The communication module 1320 may include the cellular module 1321, a Wi-Fi module 1322, a Bluetooth (BT) module 1323, a GNSS module 1324 (e.g., a GPS module, a Glonass module, a Beidou module, or a Galileo module), a near field communication (NFC) module 1325, a MST module 1326 and a radio frequency (RF) module 1327.

The cellular module 1321 may provide, for example, voice communication, video communication, a character service, an Internet service, or the like over a communication network. According to an embodiment, the cellular module 1321 may perform discrimination and authentication of the electronic device 1301 within a communication network by using the subscriber identification module (e.g., a SIM card) 1329. According to an embodiment, the cellular module 1321 may perform at least a portion of functions that the processor 1310 provides. According to an embodiment, the cellular module 1321 may include a communication processor (CP).

Each of the Wi-Fi module 1322, the BT module 1323, the GNSS module 1324, the NFC module 1325, or the MST module 1326 may include a processor for processing data exchanged through a corresponding module, for example. According to an embodiment, at least a part (e.g., two or more) of the cellular module 1321, the Wi-Fi module 1322, the BT module 1323, the GNSS module 1324, the NFC module 1325, or the MST module 1326 may be included within one Integrated Circuit (IC) or an IC package.

For example, the RF module 1327 may transmit and receive a communication signal (e.g., an RF signal). For example, the RF module 1327 may include a transceiver, a power amplifier module (PAM), a frequency filter, a low noise amplifier (LNA), an antenna, or the like. According to another embodiment, at least one of the cellular module 1321, the Wi-Fi module 1322, the BT module 1323, the GNSS module 1324, the NFC module 1325, or the MST module 1326 may transmit and receive an RF signal through a separate RF module.

The subscriber identification module 1329 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1330 (e.g., the memory 1230) may include an internal memory 1332 or an external memory 1334. For example, the internal memory 1332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1334 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1334 may be operatively and/or physically connected to the electronic device 1301 through various interfaces.

A security module 1336 may be a module that includes a storage space of which a security level is higher than that of the memory 1330 and may be a circuit that guarantees safe data storage and a protected execution environment. The security module 1336 may be implemented with a separate circuit and may include a separate processor. For example, the security module 1336 may be in a smart chip or a secure digital (SD) card, which is removable, or may include an embedded secure element (eSE) embedded in a fixed chip of the electronic device 1301. Furthermore, the security module 1336 may operate based on an operating system (OS) that is different from the OS of the electronic device 1301. For example, the security module 1336 may operate based on java card open platform (JCOP) OS.

The sensor module 1340 may measure, for example, a physical quantity or may detect an operation state of the electronic device 1301. The sensor module 1340 may convert the measured or detected information to an electric signal. For example, the sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, the proximity sensor 1340G, a color sensor 1340H (e.g., red, green, blue (RGB) sensor), a biometric sensor 1340I, a temperature/humidity sensor 1340J, an illuminance sensor 1340K, or an UV sensor 1340M. Although not illustrated, additionally or alternatively, the sensor module 1340 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. According to an embodiment, the electronic device 1301 may further include a processor that is a part of the processor 1310 or independent of the processor 1310 and is configured to control the sensor module 1340. The processor may control the sensor module 1340 while the processor 1310 remains at a sleep state.

The input device 1350 may include, for example, a touch panel 1352, a (digital) pen sensor 1354, a key 1356, or an ultrasonic input unit 1358. For example, the touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user.

The (digital) pen sensor 1354 may be, for example, a part of a touch panel or may include an additional sheet for recognition. The key 1356 may include, for example, a physical button, an optical key, a keypad, or the like. The ultrasonic input device 1358 may detect (or sense) an ultrasonic signal, which is generated from an input device, through a microphone (e.g., a microphone 1388) and may check data corresponding to the detected ultrasonic signal.

The display 1360 (e.g., the display 1260) may include a panel 1362, a hologram device 1364, or a projector 1366. The panel 1362 may be the same as or similar to the display 1260 illustrated in FIG. 12. The panel 1362 may be implemented, for example, to be flexible, transparent or wearable. The panel 1362 and the touch panel 1352 may be integrated into a single module. The hologram device 1364 may display a stereoscopic image in a space using a light interference phenomenon. The projector 1366 may project light onto a screen so as to display an image. For example, the screen may be arranged in the inside or the outside of the electronic device 1301. According to an embodiment, the display 1360 may further include a control circuit for controlling the panel 1362, the hologram device 1364, or the projector 1366.

The interface 1370 may include, for example, a high-definition multimedia interface (HDMI) 1372, a universal serial bus (USB) 1374, an optical interface 1376, or a D-subminiature (D-sub) 1378. The interface 1370 may be included, for example, in the communication interface 1270 illustrated in FIG. 12. Additionally or alternatively, the interface 1370 may include, for example, a mobile high definition link (MHL) interface, a SD card/multi-media card (MMC) interface, or an infrared data association (IrDA) standard interface.

The audio module 1380 may convert a sound and an electric signal in dual directions. At least a component of the audio module 1380 may be included, for example, in the input/output interface 1250 illustrated in FIG. 12. The audio module 1380 may process, for example, sound information that is input or output through a speaker 1382, a receiver 1384, an earphone 1386, or the microphone 1388.

For example, the camera module 1391 may shoot a still image or a video. According to an embodiment, the camera module 1391 may include at least one or more image sensors (e.g., a front sensor or a rear sensor), a lens, an image signal processor (ISP), or a flash (e.g., an LED or a xenon lamp).

The power management module 1395 may manage, for example, power of the electronic device 1301. According to an embodiment, a power management integrated circuit (PMIC), a charger IC, or a battery or fuel gauge may be included in the power management module 1395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects: vibration, haptic, and the like. Although not illustrated, a processing device (e.g., a GPU) for supporting a mobile TV may be included in the electronic device 1301. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 14:
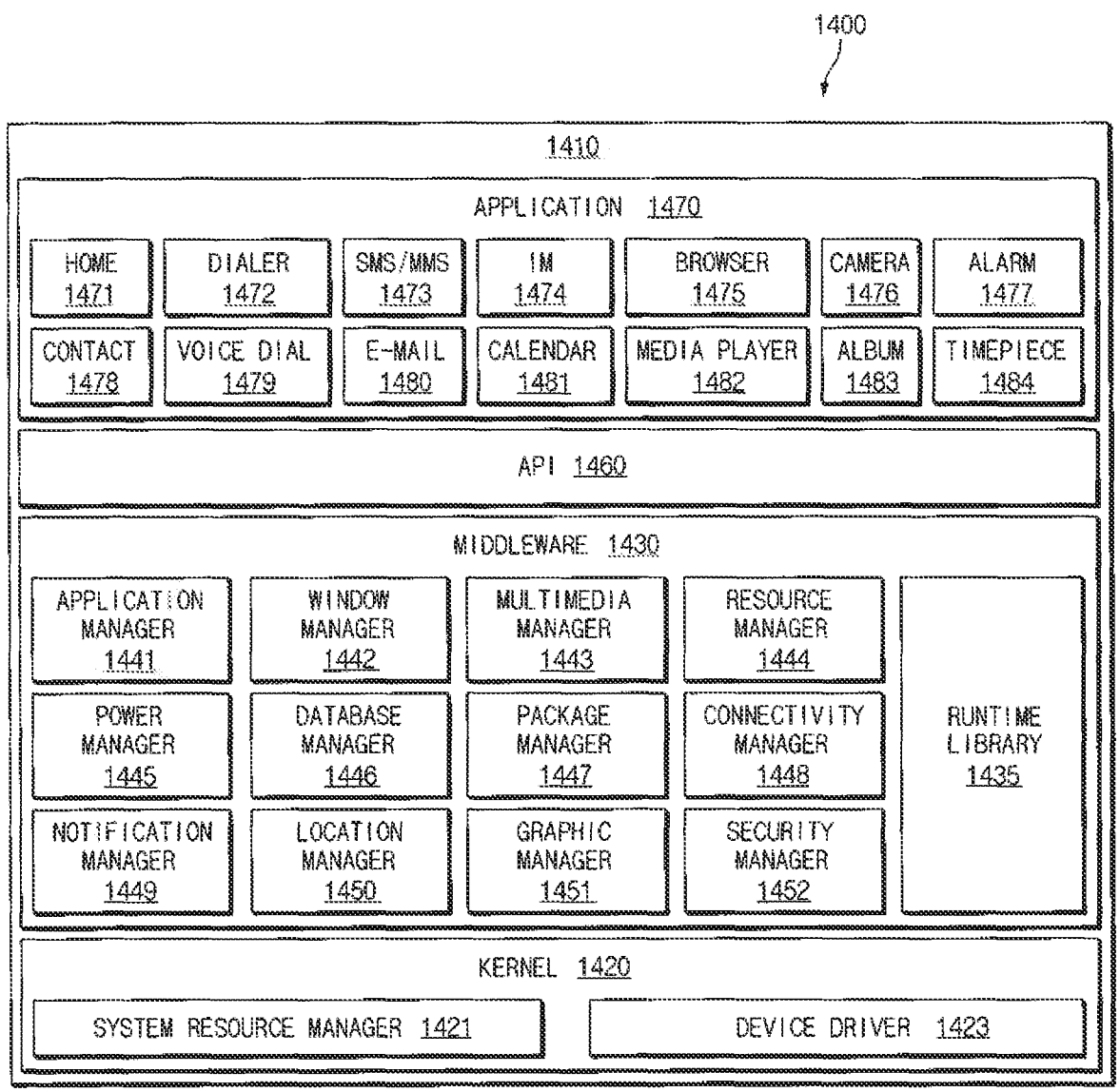
FIG. 14 is a block diagram of a program module according to various embodiments.

FIG. 14 illustrates a block diagram of a program module, according to various embodiments.

According to an embodiment, a program module 1410 (e.g., the program 1240) may include an operating system (OS) to control resources associated with an electronic device (e.g., the electronic device 1201), and/or diverse applications (e.g., the application program 1247) driven on the OS. The OS may be, for example, Android™, iOS™, Windows™, Symbian™, or Tizen™.

The program module 1410 may include a kernel 1420, a middleware 1430, an application programming interface (API) 1460, and/or an application 1470. At least a portion of the program module 1410 may be preloaded on an electronic device or may be downloadable from an external electronic device (e.g., the first electronic device 1202, the second electronic device 1204, the server 1206, or the like).

The kernel 1420 (e.g., the kernel 1241) may include, for example, a system resource manager 1421 or a device driver 1423. The system resource manager 1421 may perform control, allocation, or retrieval of system resources. According to an embodiment, the system resource manager 1421 may include a process managing unit, a memory managing unit, or a file system managing unit. The device driver 1423 may include, for example, a display driver, a camera driver, a Bluetooth driver, a shared memory driver, a USB driver, a keypad driver, a Wi-Fi driver, an audio driver, or an inter-process communication (IPC) driver.

The middleware 1430 may provide, for example, a function that the application 1470 needs in common, or may provide diverse functions to the application 1470 through the API 1460 to allow the application 1470 to efficiently use limited system resources of the electronic device. According to an embodiment, the middleware 1430 (e.g., the middleware 1243) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, a security manager 1452, or a payment manager 1454.

The runtime library 1435 may include, for example, a library module that is used by a compiler to add a new function through a programming language while the application 1470 is being executed. The runtime library 1435 may perform input/output management, memory management, or capacities about arithmetic functions.

The application manager 1441 may manage, for example, a life cycle of at least one application of the application 1470. The window manager 1442 may manage a graphic user interface (GUI) resource that is used in a screen. The multimedia manager 1443 may identify a format necessary for playing diverse media files, and may perform encoding or decoding of media files by using a codec suitable for the format. The resource manager 1444 may manage resources such as a storage space, memory, or source code of at least one application of the application 1470.

The power manager 1445 may operate, for example, with a basic input/output system (BIOS) to manage a battery or power, and may provide power information for an operation of an electronic device. The database manager 1446 may generate, search for, or modify database that is to be used in at least one application of the application 1470. The package manager 1447 may install or update an application that is distributed in the form of package file.

The connectivity manager 1448 may manage, for example, wireless connection such as Wi-Fi or Bluetooth. The notification manager 1449 may display or notify an event such as arrival message, appointment, or proximity notification in a mode that does not disturb a user. The location manager 1450 may manage location information about an electronic device. The graphic manager 1451 may manage a graphic effect that is provided to a user, or manage a user interface relevant thereto. The security manager 1452 may provide a general security function necessary for system security, user authentication, or the like. According to an embodiment, in the case where an electronic device (e.g., the electronic device 1201) includes a telephony function, the middleware 1430 may further include a telephony manager for managing a voice or video call function of the electronic device.

The middleware 1430 may include a middleware module that combines diverse functions of the above-described components. The middleware 1430 may provide a module specialized to each OS kind to provide differentiated functions. Additionally, the middleware 1430 may dynamically remove a part of the preexisting components or may add new components thereto.

The API 1460 (e.g., the API 1245) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1470 (e.g., the application program 1247) may include, for example, one or more applications capable of providing functions for a home 1471, a dialer 1472, an SMS. MMS 1473, an instant message (IM) 1474, a browser 1475, a camera 1476, an alarm 1477, a contact 1478, a voice dial 1479, an e-mail 1480, a calendar 1481, a media player 1482, an album 1483, or a timepiece 1484, or for offering health care (e.g., measuring an exercise quantity, blood sugar, or the like) or environment information (e.g., information of barometric pressure, humidity, temperature, or the like).

According to an embodiment, the application 1470 may include an application (hereinafter referred to as "information exchanging application" for descriptive convenience) to support information exchange between an electronic device (e.g., the electronic device 1201) and an external electronic device (e.g., the first electronic device 1202 or the second electronic device 1204). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1470 may include an application (e.g., a health care application of a mobile medical device) that is assigned in accordance with an attribute of an external electronic device. According to an embodiment, the application 1470 may include an application that is received from an external electronic device (e.g., the first electronic device 1202, the second electronic device 1204, or the server 1206). According to an embodiment, the application 1470 may include a preloaded application or a third party application that is downloadable from a server. The names of components of the program module 1410 according to the embodiment may be modifiable depending on kinds of operating systems.

According to various embodiments, at least a portion of the program module 1410 may be implemented by software, firmware, hardware, or a combination of two or more thereof. At least a portion of the program module 1410 may be implemented (e.g., executed), for example, by the processor (e.g., the processor 1310). At least a portion of the program module 1410 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1220), may cause the one or more processors to perform a function corresponding to the instruction. The computer-readable storage media, for example, may be the memory 1230.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A display comprising:
   a cover window,
   a display panel arranged below the cover window,
   a fingerprint sensor disposed below a fingerprint sensing area of the cover window and the display panel and configured to sense a fingerprint on the cover window, wherein the display panel consists of a plurality of display pixels arranged in rows divided between first and second sets of rows, the first set of the rows overlapping the fingerprint sensing area and the second set of the rows overlapping an area excluding the fingerprint sensing area,
   a first driver configured to apply a signal to the first set of rows,
   a second driver configured to apply a signal to the second set of rows, and
   a controller configured to cause the first driver to apply an enable signal to pixels corresponding to the fingerprint sensing area to emit light when a finger touches the fingerprint sensing area corresponding to the fingerprint sensor on the cover window.

2. The display of claim 1, wherein the controller is configured to cause the second driver to transmit a disable signal to the second set of the rows to not emit light when the finger touches the fingerprint sensing area.

3. The display of claim 1, wherein the controller is configured to:
   cause the first driver to apply the enable signal to pixels of the first set of the rows connected through a first line, and
   cause the first driver to apply the enable signal to pixels of the first set of the rows connected through a second line when the pixels connected through the first line emit light.

4. The display of claim 1, wherein the controller is configured to cause the first driver to apply the enable signal to pixels connected through a first line and pixels connected through a second line such that the pixels connected through the first line and the pixels connected through the second line emit light.

5. The display of claim 1, further comprising:
   a third driver connected to the pixels corresponding to the fingerprint sensing area,
   wherein the controller is configured to cause the third driver to apply the enable signal to the pixels corresponding to the fingerprint sensing area when the finger touches the fingerprint sensing area.

6. The display of claim 1, wherein the first driver and the second driver correspond to gate drivers or emission drivers.

7. The display of claim 1, wherein the controller is configured to cause the first driver to apply a preset voltage to the pixels corresponding to the fingerprint sensing area.

8. The display of claim 1, wherein the controller is configured to cause the pixels corresponding to the fingerprint sensing area to emit light at a first luminous flux and cause the second set of the rows to emit light at a second luminous flux when the finger touches the fingerprint sensing area, and
   wherein the first luminous flux and the second luminous flux have different values.

9. An electronic device comprising:
   a housing,
   a display arranged in the housing,
   a cover arranged over the display,
   an array of touch-sensor electrodes arranged between the cover and the display or inside the display to sense a touch on the cover,
   a fingerprint sensor disposed below a fingerprint sensing area of the cover and the display and configured to sense a fingerprint on the cover, wherein the display consists of a plurality of pixels arranged in rows divided between first, second, and third sets of rows, the first set of rows overlapping the fingerprint sensing area and the second and third sets of rows overlapping an area excluding the fingerprint sensing area,
   a first driver electrically connected from the first set of the rows,
   a second driver electrically connected from the second set of the rows,
   a third driver electrically connected from the third set of the rows,
   at least one processor placed in the housing and electrically connected to the display, the array of touch-sensor electrodes, and the fingerprint sensor, and
   at least one memory placed in the housing, electrically connected to the processor, and configured to store instructions,
   wherein the first set, second set and third set of the rows are different from each other and the first set of the rows corresponds to the fingerprint sensing area, and
   wherein, the instructions, when executed, cause the processor to:
      provide a graphical user interface (GUI) for indicating a location of the fingerprint sensor on the display, receive data for sensing a finger of a user in proximity to or in contact with the fingerprint sensing area, control the display to emit light in or around the fingerprint sensing area when the finger of the user is sensed, control the fingerprint sensor to sense a fingerprint of the finger based on light reflected by the finger among at least a portion of the light emitted from the display, and perform authentication by using the sensed fingerprint.

10. The electronic device of claim 9, wherein the at least one processor includes a display drive integrated circuit (IC) and an application processor (AP).

11. The electronic device of claim 10, wherein the instructions cause the display drive IC to provide the graphical user interface on the display.

12. The electronic device of claim 11, wherein the instructions cause the display driver IC to provide the graphical user interface in the vicinity of the fingerprint sensing area or the fingerprint sensing area while turning off the remainder of the display.

13. The electronic device of claim 10, wherein the display drive IC includes:

a source driver electrically connected to a plurality of columns of the plurality of pixels, at least one gate driver electrically connected to the rows, and at least one emission circuit electrically connected to the rows.

14. The electronic device of claim 9, wherein the first driver includes a first emission circuit, the second driver includes a second emission circuit, and the third driver includes a third emission circuit.

15. The electronic device of claim 14, wherein the number of rows connected to the first emission circuit is less than the number of rows connected to the second emission circuit.

\* \* \* \* \*